US012745051B2

(12) United States Patent
Christensen

(10) Patent No.: US 12,745,051 B2
(45) **Date of Patent: *Sep. 22, 2026**

(54) HEARING DEVICE HAVING A POWER SOURCE

(71) Applicant: Oticon A/S, Smørum (DK)

(72) Inventor: Kåre Tais Christensen, Smørum (DK)

(73) Assignee: OTICON A/S, Smørum (DK)

( * ) Notice: Subject to any disclaimer, the term of this patent is extended or adjusted under 35 U.S.C. 154(b) by 79 days.

This patent is subject to a terminal disclaimer.

(21) Appl. No.: 18/781,080

(22) Filed: Jul. 23, 2024

(65) Prior Publication Data

US 2024/0381040 A1 Nov. 14, 2024

Related U.S. Application Data

(63) Continuation of application No. 17/827,110, filed on May 27, 2022, now Pat. No. 12,081,945.

(30) Foreign Application Priority Data

May 28, 2021 (EP) .................................... 21176453

(51) Int. Cl.

*H04R 25/00* (2006.01)
*H02M 1/00* (2006.01)
*H02M 3/07* (2006.01)

(52) U.S. Cl.

CPC ........ *H04R 25/602* (2013.01); *H02M 1/0045* (2021.05); *H02M 3/07* (2013.01); *H04R 25/30* (2013.01); *H04R 25/603* (2019.05); *H04R 2225/31* (2013.01); *H04R 2225/33* (2013.01); *H04R 2225/61* (2013.01)

(58) Field of Classification Search

CPC .... H04R 25/30; H04R 25/602; H04R 25/603; H04R 2225/31; H04R 2225/33; H04R 2225/61; H02M 1/008; H02M 3/07

See application file for complete search history.

(56) References Cited

U.S. PATENT DOCUMENTS 6,643,151 B1 11/2003 Nebrigic et al.
6,859,091 B1 2/2005 Nicholson et al.
(Continued)

OTHER PUBLICATIONS

European Search Report, issued in EP Application No. 21176453.5 dated Nov. 17, 2021.

*Primary Examiner* — Huyen D Le
(74) *Attorney, Agent, or Firm* — Birch, Stewart, Kolasch & Birch, LLP

(57) ABSTRACT

A hearing aid includes: a power source; and a switched capacitor DC-DC converter electrically connected to the power source and having an input part configured for receiving charge from the power source at an input voltage of an input voltage range; an output part having multiple output ports, the output part being configured for supplying charge to the multiple output ports for providing multiple predefined output voltages; at least one flying capacitor configured for redistributing charge from the power source to the multiple output ports and/or in between the output ports; and a switching circuitry having a plurality of switches configured for electrically switching the switched capacitor DC-DC converter based on a switching scheme so as to provide the multiple predefined output voltages based on the input voltage.

20 Claims, 15 Drawing Sheets

(56) References Cited

U.S. PATENT DOCUMENTS

| | | | | |
|---|---|---|---|---|
| 9,467,765 | B2 * | 10/2016 | Siegumfeldt | H04R 1/1041 |
| 2005/0213356 | A1 | 9/2005 | Yanagida et al. | |
| 2015/0110321 | A1 | 4/2015 | Siegumfeldt | |
| 2016/0216723 | A1 | 7/2016 | Fu et al. | |
| 2017/0264192 | A1 * | 9/2017 | Junmin | H05B 45/37 |
| 2018/0317029 | A1 | 11/2018 | Larsen et al. | |
| 2020/0220456 | A1 | 7/2020 | Larsen et al. | |
| 2026/0025070 | A1 * | 1/2026 | Fan | H02M 3/07 |

* cited by examiner

ALTERNATIVE OPERATION WHEN RISK OF UNDERSHOOT

Flying capacitor configuration in phase 1 of gear P (n=26):

Flying capacitor configuration in phase 2 of gear P (n=26):

Flying capacitor configuration in phase 3 of gear P (n=26):

| Gear select | Number of phases | sw1_ph1_enable | sw1_ph2_enable | sw1_ph3_enable | sw1_ph4_enable | sw2_ph1_enable | sw2_ph2_enable | sw2_ph3_enable | sw2_ph4_enable | sw3_ph1_enable | sw3_ph2_enable | sw3_ph3_enable | sw3_ph4_enable | sw4_ph1_enable | ph2_enable | ble |
|---|---|---|---|---|---|---|---|---|---|---|---|---|---|---|---|---|
| A | 3 | 0 | 0 | 1 | 0 | 0 | 1 | 0 | 0 | 0 | 0 | 0 | 0 | | | |
| B | 3 | 1 | 0 | 0 | 0 | 0 | 1 | 0 | 0 | 0 | 0 | 0 | 0 | | | |
| C | 2 | 1 | 0 | 0 | 0 | 0 | 0 | 0 | 0 | 0 | 0 | 0 | 0 | | | |
| D | 3 | 0 | 0 | 1 | 0 | 0 | 1 | 0 | 0 | 0 | 0 | 0 | | | | |
| E | 3 | 1 | 0 | 0 | 0 | 0 | 0 | 0 | 0 | 0 | 1 | 1 | | | | |
| F | 3 | 0 | 1 | 0 | 0 | 1 | 0 | 0 | 0 | 0 | 0 | | | | | |
| G | 2 | 1 | 0 | 0 | 0 | 0 | 0 | 0 | 0 | 0 | 1 | | | | | |
| H | 3 | 0 | 1 | 0 | 0 | 0 | 0 | 1 | 0 | 0 | 0 | | | | | |
| I | 3 | 1 | 0 | 0 | 0 | 0 | 0 | 0 | 0 | 0 | | | | | | |
| J | 3 | 0 | 1 | 0 | 0 | 0 | 0 | 1 | 0 | 0 | | | | | | |
| K | 3 | 1 | 0 | 0 | 0 | 0 | 0 | 0 | 0 | | | | | | | |
| L | 3 | 0 | 1 | 1 | 0 | 0 | 0 | 0 | 0 | | | | | | | |
| M | 3 | 0 | 1 | 1 | 0 | 0 | 0 | 0 | | | | | | | | |
| N | 3 | 1 | 0 | 0 | 0 | 0 | 1 | 0 | | | | | | | | |
| O | 3 | 0 | 1 | 0 | 0 | 0 | 0 | 1 | | | | | | | | |
| P | 3 | 0 | 1 | 0 | 0 | 1 | 0 | | | | | | | | | |
| Q | 4 | 0 | 0 | 1 | 1 | 0 | 0 | | | | | | | | | |

HEARING DEVICE HAVING A POWER SOURCE

This application is a Continuation of copending application Ser. No. 17/827,110, filed on May 27, 2022, which claims priority under 35 U.S.C. § 119 (a) to application Ser. No. 21/176,453.5, filed in Europe on May 28, 2021, all of which are hereby expressly incorporated by reference into the present application.

FIELD OF THE DISCLOSURE

The present disclosure relates to a hearing device, in particular a hearing aid, having a power source and to a method for producing such a hearing device.

BACKGROUND

The electronics in a portable electronic device, such as a hearing device or hearing aid, generally require Direct Current (DC) electrical power. Typically, a battery is used as the power source to provide this DC electrical power. Ideally, the power source would perfectly match the requirements of the device. However, most often voltage and current provided by the battery are unsuitable for directly powering all the electronics of the device. For example, the voltage level provided by the battery may differ from the voltage level required by a wireless interface which again may differ from that of a signal processor in the device. Thus, different parts of the electronics in a device may operate at different voltage levels, and therefore a power source providing different voltage levels is required.

One possibility of adapting voltage levels is to use buck DC-DC converters, which are based on an inductor coil for dynamic energy storage. However, due to their inductor coil, such buck DC-DC converters are unfavorably large, in particular in the context of small electronics devices such as hearing devices or hearing aids. Further, said inductor coil may act as an antenna and induce unwanted Electro-Magnetic Interference (EMI) in the hearing device.

An alternative to buck DC-DC converters is linear regulation. However, linear regulation involves significant energy loss, which is problematic since for a device as described above high power efficiency is desirable.

SUMMARY

It is thus an object to provide a hearing device that allows for providing multiple desired output voltages for a wide range of input voltages while ensuring a compact device architecture, low electro-magnetic interference, and good power efficiency. It is a further object of the present disclosure to provide a method for operating such a hearing device.

A hearing device may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as a hearable, an earphone or a headset adapted to receive an audio signal electronically, possibly modifying the audio signal and providing the possibly modified audio signals as an audible signal to at least one of the user's cars. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the car with a tube leading air-borne acoustic signals into the car canal or with a receiver/loudspeaker arranged close to or in the car canal such as in a Behind-the-Ear type hearing aid, and/or ii) arranging the hearing device entirely or partly in the pinna and/or in the car canal of the user such as in an In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

A hearing device or hearing aid as provided in the present disclosure may be connected to a unit having an output transducer and a number of other, active, electronic components, such as a sensor, which could be one or more of an accelerometer, a microphone, a capacitive sensor, an optical sensor and/or optical transmitter working in cooperation with an optical sensor, an EEG electrode, a temperature sensor. Other types of sensors may be included in the unit. Further, one or more components such as processors, filters, communication devices, etc. may be included in the unit. Adding one or more components to the unit, e.g. an in-the-ear part, could require adding additional, physical, connections to a behind-the-ear housing, and thus also additional pins to a contact and plug. Adding components to an in-the-ear housing or unit could also require that the input power delivered from a power source located in a behind-the-ear housing be locally converted, so that supply voltage from the power source might only need to be transferred at one voltage to the in-the-ear housing, and a DCDC converter in the in-the-ear housing or unit may then convert the input/supply voltage to the locally required voltages.

Generally, an electronic device comprises several sub-systems, which each operate at a specific voltage level. However, a battery source does not inherently have multiple voltage levels that it can provide to each sub-system. Thus, there is a need to convert the voltage from a supply level to one or more operation levels. The operational voltages may be above or below the voltage supplied from the battery source.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

When a DC power source, such as a battery, is used to power an electronic device designed to operate at a DC voltage level different than that of the DC power source, DC-DC converters can be used. Some DC-DC converters utilize a switched capacitor array circuit which includes a plurality of capacitors and electronic switching circuitry for switching the capacitors into various configurations. Switched capacitor DC-DC converters implement a technique of switching capacitors on and off in such a way as to periodically charge capacitors in one switch position, typically during one phase, and deliver the capacitor charge in a different switched position, typically during another phase. Switched capacitor voltage converters have several applications. A switched capacitor voltage converter generally can be an up-converter, a down-converter and/or an inverter.

According to a first aspect of the present disclosure, a hearing device, in particular a hearing aid, is provided, the hearing device comprising a power source; and a switched capacitor DC-DC converter electrically connected to the power source and comprising an input part configured for receiving charge from the power source at an input voltage of an input voltage range; an output part comprising multiple output ports, the output part being configured for supplying charge to the multiple output ports for providing multiple predefined output voltages; at least one flying capacitor configured for redistributing charge from the power source to the multiple ports and/or in between the output ports; and a switching circuitry comprising a plurality of switches configured for electrically switching the switched capacitor DC-DC converter based on a switching scheme so as to provide the multiple predefined output voltages based on the input voltage.

According to a second aspect of the present disclosure, a method for operating a hearing device, in particular a hearing device according to any of the preceding claims, is provided, the method comprising: providing power of a power source to a switched capacitor DC-DC converter electrically connected to the power source; receiving, at an input part of the switched capacitor DC-DC converter, charge from the power source at an input voltage; supplying charge to multiple output ports of an output part of the switched capacitor DC-DC converter at one or more corresponding output voltages; redistributing charge from the power source to the multiple output ports and/or in between the output ports via at least one flying capacitor; and electrically switching the switched capacitor DC-DC converter comprising a switching circuitry having a plurality of switches according to at least one predetermined mode of operation.

According to a further aspect, there is also described a computer program code, the computer program code when executed by a processor causing an apparatus, such as a hearing device to perform the method according to the second aspect.

Exemplary features of the any aspect of the present disclosure may have one or more of the properties described below.

The power source may comprise a rechargeable and/or non-rechargeable battery configured to provide charge at a battery voltage level. Examples for rechargeable batteries are lithium-ion (Li-ion) type batteries and ZnO type batteries. Such a battery may supply DC current at a battery supply level which may vary due to load, temperature, state of charge and/or other reasons. While non-rechargeable batteries are advantageous in terms of acquisition costs, rechargeable batteries are advantageous in terms of usability and operational costs.

The switched DC-DC converter may be electrically connected to the power source via a wire and/or a conducting path, the conducting path being part of an Integrated Circuit (IC) chip. An IC chip advantageously allows for a particularly compact architecture of the hearing device. Throughout the present specification it is possible to add an optional series connected safety switch or fuse. This could e.g. in some instances be a safety requirement when using a lithium-ion type battery.

The input part of the converter may comprise an input port configured for receiving charge from the power source at an input voltage. In other words, electrical power provided by the power source, e.g. a battery, provided at an input voltage, e.g. a battery voltage, is fed into the converter through the input part. The input part may be part of an IC chip. The input part may receive the charge directly from the power source or by means of a converter.

The input voltage may be in a range between 0.5 V and 5V (input voltage range of 0.5V to 5V), in particular in a range between 0.86 V and 4.4 V (input voltage range of 0.86V to 4.4V). While ZnO type batteries used in hearing devices typically provide an input voltage between 0.86 V and 1.65 V (single ZnO type battery) and/or between 1.7 V and 3.3 V (two ZnO type batteries in series), Li-ion type batteries used in hearing devices typically provide an input voltage in between 2.5 V and 4.4 V. Thus, an input voltage range from 0.86 V to 4.4 V advantageously enables using a variety of common battery types.

The output part of the converter may comprise one, two, three, four, or more output ports and is configured to supply charge to the one, two, three, four, or more output ports at one, two, three, four, or more corresponding desired output voltages, in particular pairwise different output voltages.

Providing a plurality of desired output voltages, in particular all different output voltages, advantageously allows for providing suitable voltages to one or more recipient devices included in the hearing device such as a microphone, a receiving unit for electronically receiving an input audio signal, a signal processing unit for processing the input audio signal or an output unit for providing an audible signal to the user. An output part providing a plurality of output voltages, in particular pairwise different output voltages, thus advantageously allows for using existing technology, e.g. existing third party electronic components or components used in previously developed hearing devices. In particular, a dedicated output port providing the voltage required by the DSP of the hearing device advantageously enables an increased computational efficiency of the DSP.

Herein a flying capacitor may in particular be understood as a capacitor which can dynamically be used by means of the switching circuitry and/or which can redistribute the charge between certain components, such as the power source and/or output ports.

The at least one flying capacitor may be configured for moving charge from the power source, e.g. a battery, to the output ports and/or in between the output ports. As will be described in more detail below, the at least one flying capacitor may be a Surface-Mount Device (SMD) capacitor, an on-chip capacitor, or any combination thereof. Providing the at least one flying capacitor as an SMD capacitor advantageously allows for a lower switching rate and/or a lower parasitic capacitance.

The at least one flying capacitor, in particular an SMD type flying capacitor, may have a nominal capacity of at least 1 μF, in particular of at least 4 μF, in particular of approximately 4.7 μF. A capacity of at least 1 μF, in particular of at least 4 μF, in particular of approximately 4.7 μF is larger than typical capacities of on-chip switched capacitors by a factor of approximately 1000. Switched capacitors with large capacities are advantageous in terms of power efficiency, as capacitors with large capacities requires smaller (i.e. lower) switching frequencies, thus suffering less power dissipation. Thus, the at least one flying capacitor, in particular an SMD type flying capacitor, having a capacity of at least 1 μF, in particular of at least 4 u F, in particular of approximately 4.7 μF advantageously allows for an enhanced power efficiency. For example, a power efficiency of the at least one flying capacitor may amount to approximately 95%, significantly exceeding typical power efficiencies of on-chip capacitors of around 70-85%, such as up to 85%. It is currently considered that SMD capacitors with nominal values of e.g. 0.47 μF, 1.0 μF, 2.2 μF, 4.7 μF or 10 μF are particularly attractive because these are available in very small physical sizes. If SMD capacitors with other nominal values would be available in similar small physical sizes, they could possibly be used Each flying capacitor of the switched capacitor DC-DC converter is typically a SMD capacitor, which allows significant lowering of the switching rate.

The switching circuitry comprising a plurality of switches configured for electrically switching the switched capacitor DC-DC converter based on a switching scheme so as to provide the multiple predefined output voltages based on the input voltage. Thus, the switching scheme may comprise various switching configurations. A specific switching configuration of the switching scheme may be used to provide the multiple predefined output voltages from a specific input voltage of the input voltage range. In other words, a specific switching configuration may be chosen based on the input voltage. In this way, the multiple predefined output voltages may be provided or generated based any input voltage of the input voltage range.

At least one of the switching configurations of the switching scheme, for example each switching configuration, typically comprises at least three switching sub-configurations, each switching sub-configuration being obtained during an associated phase and each switching sub-configuration providing associated electrical connections for each flying capacitor.

The at least three switching sub-configurations allows connecting, during each phase, the two terminals of each flying capacitor between any two of the following list:

the input port,
one of the output ports,
another of the output ports,
the ground,
another flying capacitor terminal, in order to charge or discharge said flying capacitor, in order to generate the desired output voltages.

Specifically, this allows to provide charge for the decoupling capacitors on the output ports, such that the different ratios relative to the input voltage are realized, in order to generate the desired output voltages.

The switching configuration may be obtained based on the input voltage and at least three clock phase signals defining the at least three phases associated with the switching configuration. The at least three clock phase signals are typically obtained by a divider module using the system clock.

More precisely, the value of the input voltage can be used to determine an associated voltage ratio (gear). The connections, during each phase, of each flying capacitors needed to obtain each voltage ratio are typically predetermined and stored in a table. The determined voltage ratio can then be used with the table to find the associated needed connections, and switch control signals, controlling the opening and closing of the switches of the switch core of the switched capacitor DC-DC converter, and therefore defining each switching sub-configuration, can be generated using the table and the at least three clock phase signals.

The switching configuration is typically periodical, the associated at least three clock phase signals being periodical and the at least three phases being therefore repeated periodically.

The use of at least three phases, in combination with three or more flying capacitors and three or more output voltages enables the possibility of supporting many more voltage ratios (gear definitions) than what is possible with only two phases. This enables the generation of output voltages with much tighter tolerances and this in turn reduces subsequent LDO power losses significantly at the system level. As a consequence, the total system power conversion efficiency from battery to point-of-load (the user e.g. a DSP processor) is improved despite the inherently lower switched capacitor DC-DC converter efficiency when using three or more phases. This is particularly the case when using SMD capacitors because here the efficiency penalty of using three or more phases is relatively modest.

The input voltage range may be divided into multiple subranges, preferably more than 5, more preferably more than 10 and more preferably more than 15 subranges, wherein the switching scheme provides a switching configuration (so as to control or use the switches in a specific configuration) for at least some, preferably for each subrange of the input voltage range so as to generate the multiple predefined output voltages. In an example, the input voltage range is divided into 17 subranges. Providing a switching scheme for the above number of subrange allows for providing desired output voltages with little tolerances, in particular with approximately +10%/−5%. Each switching configuration may be understood as a certain voltage ratio mode, as it transforms the input voltage into the respective output voltages by means of respective ratios, The specific ratios used for each input voltage subrange may also be referred to as "gears". Throughout the present specification the terms are used synonymously.

The switching circuitry may comprise static and/or dynamic switches. The dynamic switches may in particular be used for providing different switching configurations, each switching configuration comprising at least three switching sub-configurations, of the switched capacitor DC-DC converter. The static switches are constantly open or closed during a certain configuration of the switching scheme, i.e. in certain gears. The static switches may provide additional functionality, e.g. for handling special scenarios, such as when a chipset is powered via a programming interface, for instance.

The hearing device may further comprise, for some or each of the multiple output ports, at least one static decoupling capacitor arranged at and electrically connected to a respective one of the multiple output ports, wherein the at least one static decoupling capacitor is configured for providing the one or more output voltages and/or for functioning as an internal power supply. In other words, the at least one static decoupling capacitor may be used as power supply for one or more recipient devices included in the hearing device such as a microphone, a receiving unit, a memory unit, such as Non-volatile memory device, a radio or wireless interface, such as Bluetooth and/or nearfield magnetic induction system, a signal processing unit or an output unit, or may be used as power supply in the switching circuitry itself.

The switched capacitor DC-DC converter for providing the multiple predefined output voltages based on the input voltage may comprise at least or at most seven capacitors and in particular precisely seven capacitors, not counting an optional decoupling capacitor on the input voltage node. The switched capacitor DC-DC converter for providing the multiple predefined output voltages based on the input voltage may comprise at least or at most three flying capacitors and in particular precisely three flying capacitors. It has been found that specifically three flying capacitors are sufficient for providing various desired output voltages, in particular the typical output voltages of 0.6V, 0.9V, 1.2V and 1.8V, typically with a tolerance better than +10/−5%.

The switched capacitor DC-DC converter for providing the multiple predefined output voltages based on the input voltage may comprise a static decoupling capacitor for each of the output ports. For instance, the switched capacitor DC-DC converter may comprise at least or at most four static decoupling capacitors and in particular precisely four static decoupling capacitors. Said four static decoupling capacitors advantageously being SMD type capacitors with capacitance values comparable to the flying capacitors or larger. In particular, those output nodes with the highest loads may benefit from an order of magnitude larger capacitance than the flying caps, or more.

The switched capacitor DC-DC converter for providing the multiple predefined output voltages based on the input voltage may comprise at least four, preferably precisely four output ports for providing the predefined output voltages. Four output voltages are typically sufficient for providing power to various components of a hearing device.

The multiple output voltages may comprise or correspond to output voltages of approximately 0.6 V, 0.9 V, 1.2 V, and/or 1.8 V, and/or the at least four static decoupling capacitors operate at a voltage of approximately 0.6 V, 0.9 V, 1.2 V, and/or 1.8 V. Herein, approximately is to be understood as within +10% and/or within −5%. While many commercial and/or off-the-shelf devices require voltages of 1.8 V, 1.2 V, and/or 0.9 V, the digital signal processor, DSP, requires a voltage of 0.6 V for operating with high power efficiency. By directly providing suitable output voltages, further electronic components for converting the output voltage to required voltage levels are dispensable or may be realized with low-dropout (LDO) regulators with minimal power loss. As an example, realizing a 0.8V supply for embedded SRAM memory may be realized with an LDO from the 0.9V output voltage domain with a power loss of only (1−0.8V/0.9V)=11%. Thus, providing charge to four or more output ports at four or more corresponding output voltages advantageously enables using commercial and/or off-the-shelf devices together with a DSP with enhanced power efficiency and offers a less complex device architecture.

The switched capacitor DC-DC converter may comprise surface mounted capacitors, wherein in particular at least the flying capacitors and/or the static decoupling capacitors are Surface-Mount Devices, SMD. Thus, the respective capacitors are in particular mounted onto the surface of a printed circuit board. SMD capacitors are specifically advantageous as they cover smaller areas than e.g. on-chip capacitors or switched inductor bucks for a chosen capacity. Additionally, the total capacitance of an SMD is significantly higher (e.g. more than 1000 times larger) than a typical on chip capacitance. Moreover, the electromagnetic interference, EMI, is significantly lower than e.g. switched inductor bucks. Lastly, the efficiency can be as high as 95-99% (due to the higher capacity and thus lower switching frequency) which is significantly higher than e.g. on chip capacitors or switched inductor buck converters.

The at least one flying capacitor and/or the at least one static decoupling capacitor may however also be realized as layers in an integrated circuit chip.

The hearing device may further comprise at least one holding capacitor arranged in between and electrically connected to the power source (typically via the DC-DC converter itself and an additional internal charge pump using the DC-DC output voltages) and a reference voltage e.g. ground/earth/vss, wherein the holding capacitor is configured for providing an additional voltage level. The additional, or intermediate, capacitor may be charged with a charge-pump realized using on-chip switch capacitor circuitry. The intermediate voltage (which may also be called "additional voltage") may be used as an internal power supply for the switching circuitry and/or as a power supply for other components in the hearing device. Such additional or intermediate voltages may e.g. be 2.4V or 3.0V and can have significant positive impact on the power needed to drive the switches in the DC-DC converter. The at least one holding capacitor may be or comprise a fixed capacitor which may then be mounted or placed between the power source (typically via the DC-DC converter itself and an additional internal charge pump) and a reference voltage, the reference voltage being ground/earth.

The switched capacitor DC-DC converter may further comprise a plurality of Low Dropout Regulators, LDOs, arranged in parallel with the multiple output ports, wherein the plurality of Low Dropout Regulators is configured for detecting and/or compensating undervoltage at at least one of the multiple output ports. At least one of the plurality of LDOs may be respectively arranged electrically in parallel with each of the multiple output ports of the switched capacitor DC/DC converter circuit.

Being configured for detecting and compensating undervoltage, the plurality of LDOs advantageously enables the switched capacitor DC-DC converter to provide sufficient electrical power also during power intensive events such as read-to-write operations of an EEPROM and/or FLASH device, a data package transmission or reception event such as a Bluetooth or Bluetooth LE transmission, driving the output transducer of the hearing during audio peaks, reading and processing signals from a sensor in or associated with the hearing aid, or other events that require more than normal power from the battery over a relatively short period of time.

The hearing device may further comprise a controller configured to control the operation of the Low Dropout Regulators.

At least one of the plurality of LDOs may be activated if the input voltage is below a given threshold. For example, such a threshold may be somewhere between 1.6 V and 1.9 V, in particular at approximately 1.8 V.

At least one of the plurality of LDOs may be configured to a respective normal level or slightly above prior to activation. This advantageously allows the at least one LDO to operate instantaneously when needed so as to avoid a drop on voltage during the period used for pre-charging a flying capacitor between gears, i.e. during gear-shift.

The switched capacitor DC-DC converter may be configured for operation in multiple, in particular at least three predetermined modes of operation, the predetermined modes of operation comprising at least one of a first (e.g. normal) mode; an second (e.g. undershoot) mode; and a third (e.g. startup and/or gear shift, sometimes referred to as ratio shift) mode.

For instance, the first or normal mode is used during normal operation of the switched capacitor DC-DC converter, i.e. the normal mode may in particular be used when the switched capacitor DC-DC converter is not starting up, when there are no ratios shifted and/or when the output voltages are nominal, i.e. none of the output voltages of the switched capacitor DC-DC converter is dropping below a predefined threshold.

For instance, the second or undershoot mode is used when one or more of the output voltages of the switched capacitor DC-DC converter drop below a predefined threshold. For instance, a common or individual (absolute or relative) thresholds may be defined for the respective output voltages.

For instance, the third or startup/gear shift mode, sometimes referred to as ratio shift mode, may be used during startup of the switched capacitor DC-DC converter. The third mode may also be used when switching from one configuration of the switching scheme to another configuration of the switching scheme employed in the switched capacitor DC-DC converter, i.e. from one gear to another.

Specifically, in the first mode, the switching circuitry may be active. In the second and/or third mode, however, the switching circuitry may be inactive or circumvented. Rather, in the second and/or third mode one or more linear dropout regulators are used for providing the predefined output voltages instead of the switching circuitry.

However, specifically with respect to the second or undershoot mode an alternative approach may be used by temporarily increasing a switching rate of the switched capacitor DC-DC converter, as will be explained in more detail below.

In this approach it may in particular be repeatedly checked whether at least one of the multiple output voltages drop below a predefined threshold and, in case the at least one of the multiple output voltages drops below a predefined threshold, the switching rate of the switched capacitor DC-DC converter may be temporarily increased. This lowers the output impedance so that the output voltage levels can again rise to a nominal level.

The switched capacitor DC-DC converter may further comprise a charge pump configured to be activated if the input voltage is below a first voltage threshold, the charge pump being configured to supply charge to the switched capacitor DC-DC converter.

The charge pump may be inserted before a first LDO, i.e. an LDO electrically directly connected to the input, e.g. battery, voltage, in case said input, e.g. battery, voltage is below a threshold voltage, e.g. 1.8 V. This advantageously allows for compensating an input voltage below a threshold voltage. Implementing the charge pump as a fully integrated circuit component of the IC chip, it may be realized using only a small area of the IC chip and without needing additional SMD capacitors, advantageously allowing for a less complex and more compact architecture.

The switched capacitor DC-DC converter may be arranged in a behind-the-ear housing, in an in-the-ear housing, and/or in a speaker unit shaped to be positioned in an ear canal of a wearer. A hearing device, e.g. a hearing aid, may comprise multiple DC-DC converters.

The hearing device may comprise a behind-the-ear part and an in-the-ear part, and the power source is arranged in the behind-the-ear part and the switched capacitor DC-DC converter is arranged in the in-the-ear part. Being arranged in the behind-the-ear part, the power source, e.g. a battery, may provide voltage to the in-the-ear part. The power source may be arranged in the behind-the-ear part is configured for providing the highest one of the one or more output voltages to the switched capacitor DC-DC converter arranged in-the-ear part. This allows for directly outputting the highest one of the one or more output voltages as supplied by the power source without requiring any conversion, thus allowing for a simplified switching circuitry of the hearing device.

The switched capacitor DC-DC converter may be followed by a linear type voltage regulator (LDO) configured for suppressing noise or ripple on the one or more output voltages, advantageously providing more stable output voltages (i.e. tighter tolerances) and/or additional voltage outputs.

The at least one flying capacitor may comprise a 0201 Imperial type capacitor, i.e. a capacitor comprising a base area of 0.6 mm*0.3 mm. Such a small base area is advantageous in terms of space requirements of the hearing device.

The switched capacitor DC-DC converter may provide a switching scheme with switching configurations for subranges of the input voltage range having a first width (for instance around 150 mV) for the first number of subranges and having a second (larger) width (for a instance around 300 mV) for a second number of subranges (e.g. above a certain threshold input voltage). In other words, in an example, every 150 mV (and after a threshold every 300 mV) the employed switching scheme may prescribe a new switching configuration, typically comprising at least three switching sub-configurations, each switching sub-configuration being applied during an associated phase and each switching sub-configuration providing associated connections for each flying capacitor, resulting in different ratios applied to the input voltage in order to generate the desired output voltages. There may be an overlap between the gears (or ratios) where the +10/−5% tolerance may be realized. This overlap, or hysteresis window, may then be used actively to avoid frequent switching between two gears due to ripple on the input voltage. It is advantageous to postpone a gear shift as long as possible during battery discharge, as this is believed to give the lowest current draw from the battery. Due to ripple on both input and output voltages the actual input voltage range used for each gear will vary during normal use.

An intermediate voltage step (e.g. to the center of the +10/−5% tolerance range) may be introduced during and/or between gear shifts and/or at start-up transition modes, advantageously avoiding sharp steps in the one or more output voltages and/or large in-rush currents from the input node.

For instance, the switched capacitor DC-DC converter is configured such that the switching scheme provides (in the example of four output voltages) as a first output voltage a/n*input voltage, as a second output voltage b/n*input voltage, as a third output voltage c/n*input voltage and/or as a fourth output voltage d/n*input voltage, wherein the values for a, b, c and/or d remain constant for the different switching configurations and the value for n changes from switching configuration to switching configuration (e.g. increases with increasing input voltage). As an example, the values of a, b, c and d may be 12, 8, 6 and 4 respectively, while the value for n may be 6 for a first (lower) subrange of the input voltage (e.g. 0.86-1.03V) and increase until 28 for a last (higher) subrange of the input voltage (e.g. 4.11-4.40V).

To put it differently, the largest output voltage may amount (for each switching configuration) to 12/n times the input voltage, wherein n is between 6 and 30, boundary values included. As explained, n is chosen depending on the input voltage or input voltage subrange, and n is chosen so that the input voltage level is divided into a plurality of input voltages where n increases with increasing input voltage level, wherein for a small input voltage, e.g. 0.86 V, n is small, e.g. n=6, and for a high input voltage, e.g. 4.4 V, n is large, e.g. n=28. As a result, dividing the input voltage by n may yield an approximately constant value C for different input voltages, advantageously enabling a constant largest output voltage of 12 times C, wherein the constant C may be determined as input voltage divided by n.

The second largest output voltage of the one or more output voltages may amount to approximately ⅔ of the largest output voltage, the third largest output voltage amounts to approximately ½ of the largest output voltage and the fourth largest output voltage amounts to approximately ⅓ of the largest output voltage.

The at least one flying capacitor and/or the at least one static decoupling capacitor may be off-chip capacitors or on-chip capacitors, such as MoM capacitors, MOS capacitors, MiM capacitors, or deep trench capacitors.

At least one of the multiple output ports may simultaneously be configured as a power source input port configured for receiving charge from an external charging device e.g. via an LDO. In this mode the flying capacitors are used to distribute charge from this voltage output to the other voltage outputs. Simultaneously it is possible to charge to the power source e.g. a battery via parallel charging circuitry. Configuring at least one output port simultaneously as a power source input port allows for reducing the total number of ports of the hearing device, thereby allowing for a more compact and less complex device architecture.

A flying capacitor precharge phase may be performed prior to changing the ratio, i.e. prior to or more precisely during a gear shift. A flying capacitor precharge phase advantageously allows for changing gear in a controlled manner with a softer transition of the output voltages and reduced inrush currents from the input node, which could be seen as less disruption of the output supply, and which helps to reduce noise/artefact in the one or more output voltages.

Herein, the disclosure of any method steps shall also be considered as a disclosure for respective means being configured for performing a respective method step. Likewise, the disclosure of certain means for performing a method step shall also be considered as a disclosure for a respective method step.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

Figure 1:
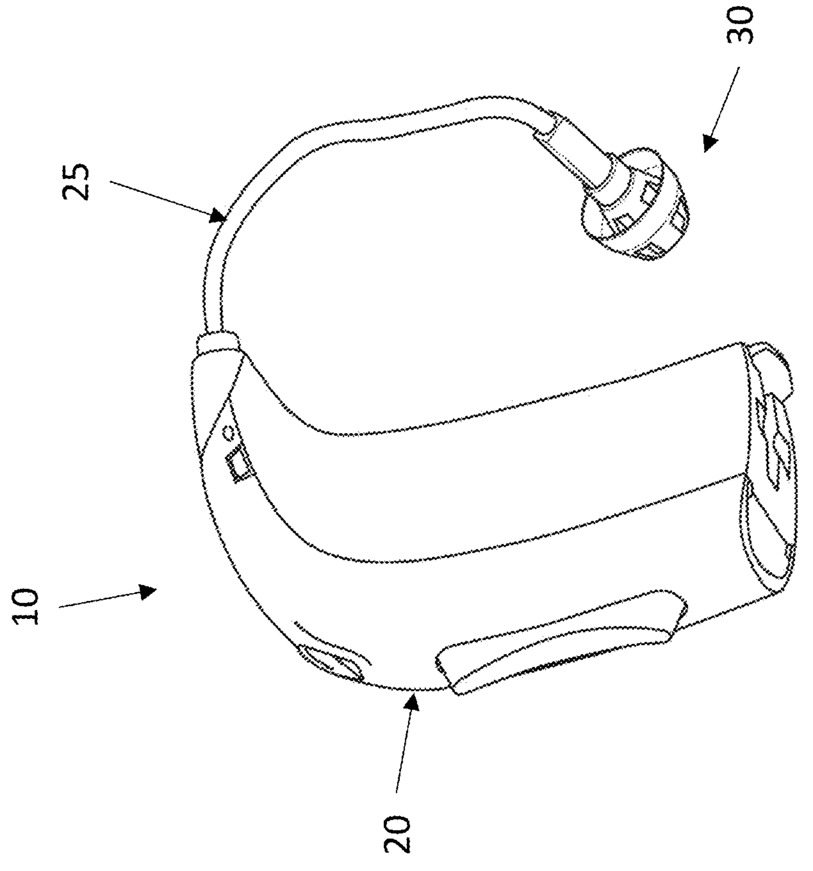
FIG. 1 schematically illustrates a behind-the-ear type hearing aid.

FIG. 1 shows a behind-the-ear hearing aid 10. Here, a behind-the-ear housing 20 holds a number of components, such as a battery, an input transducer, a sound processor and the like. The battery may be of a rechargeable type, such as a Lithium-ion battery, or may in some cases be a single use battery, such as a zinc-air battery. An in-the-ear housing 30 holds an output transducer, which delivers an acoustic signal to the ear canal of the wearer. In other variants, the output transducer is placed in the behind-the-ear housing 20 and the acoustic signal is provided to the ear canal via a tube-like structure ending in an ear-canal device. Behind-the-ear housing 20 and in-the-ear-housing 30 are connected by a wire 25.

Figure 2:
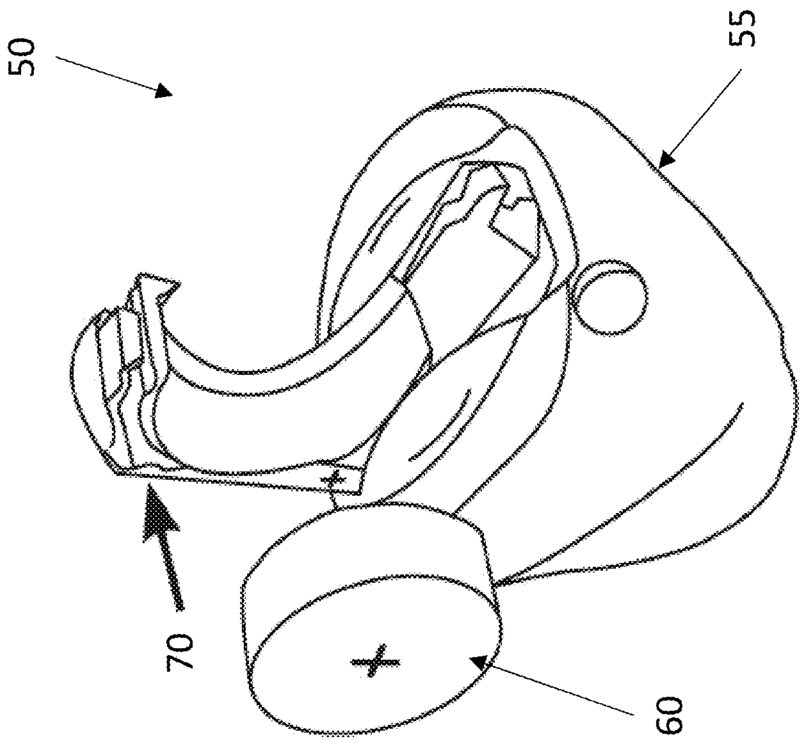
FIG. 2 schematically illustrates an in-the-ear type hearing aid.

FIG. 2 illustrates an in-the-ear hearing aid 50. Here, all components are positioned in the in-the-ear housing 55, which may comprise a part custom shaped to the specific ear canal of the wearer. In other variants, the in-the-ear-housing 55 as a whole is shaped to be fitted entirely into the ear canal of the wearer, and as such does not need to be specifically shaped to the ear canal. In-the-ear housing 55 comprises a battery 60, which as above may be single use or rechargeable, and further components such as an input transducer, a processor, an output transducer, and/or other components. Here, battery 60 is held in a pivotal battery drawer 70 configured for easily putting in and taking out battery 60. In some instances, battery 60 is fixed in the hearing aid.

Figure 3:
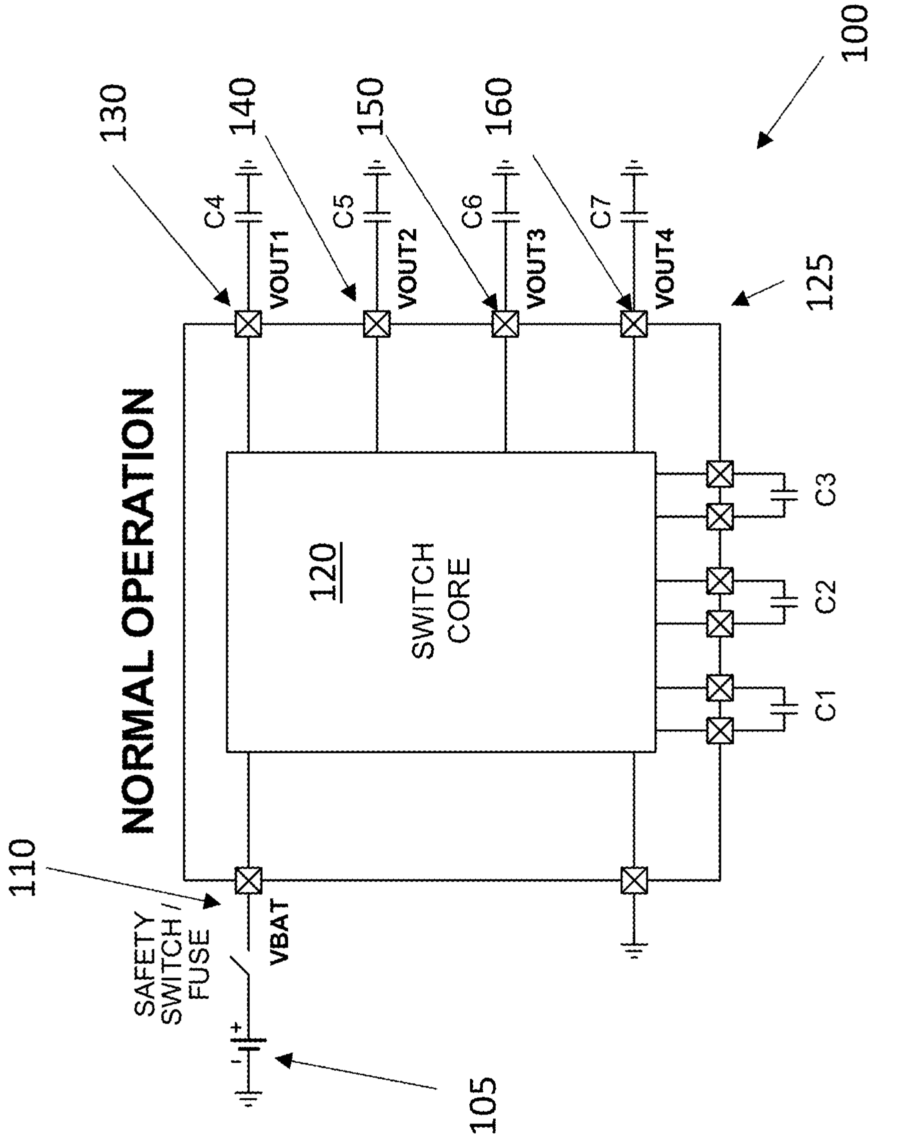
FIG. 3 schematically illustrates a switched capacitor DC-DC converter in normal operation.

FIG. 3 illustrates a switched capacitor DC-DC converter 100 comprised by e.g. a hearing aid. The switched capacitor DC-DC converter 100 receives charge from a power source 105 at input port 110. Input port 110 is configured for receiving charge at an input voltage from the power source. A battery safety switch or fuse may be inserted between 105 and 110. Further to this end, the hearing aid may comprise a power source 105, e.g. a battery, providing the input voltage, e.g. a battery voltage denoted VBAT in FIG. 3, at input port 110. The switched capacitor DC-DC converter 100 further comprises a switch core 120, an example for a switching circuitry. The battery may be rechargeable or replaceable.

The switched capacitor DC-DC converter 100 further comprises three flying capacitors C1, C2 and C3 in FIG. 3, which may be provided off-chip as SMD components. These components have high capacitances, with a low parasitic coupling, which advantageously allows them to switch relatively slow with low power dissipation. Switch core 120 comprises a plurality of switches configured to connect the flying capacitors C1, C2, C3 in different configurations.

By using the input voltage provided at input port 110 in connection with switch core 120 to connect the flying capacitors C1, C2, C3 in different configurations, switched capacitor DC-DC converter 100 provides four output voltages at four output ports 130, 140, 150, 160, the output ports 130, 140, 150, 160 being part of an output part 125. The output part 125 of the switched capacitor DC-DC converter 100 is configured for supplying charge to the multiple output ports 130, 140, 150, 160. The output voltages denoted Vout1, Vout2, Vout3, Vout4, in FIG. 3 are e.g. 1.8 V at output port 130, 1.2V at output port 140, 0.9 V at output port 150 and 0.6 V at output port 160. Such voltages are typically sufficient for powering various components of the hearing aid, such as communication modules, processors, memories, input and output transducers However, other voltages or voltage combinations depending on the needs are possible of course.

The switched capacitor DC-DC converter 100 with core 120 may be configured to operate in different (in this case in three) operation modes, as will be explained in more detail below.

In a so called "normal operation mode", the switch core 120 generates four output voltages at output ports 130, 140, 150, 160 with very high power-efficiency, which have been shown to be better than 95%. This is because the switching rate is optimized for normal load conditions, including high current peaks, and, because there is enough margin between the unloaded output voltages and the rated output minimum voltages, which leaves enough room for output voltage ripple. As this mode of operation is active most of the time—it is this mode that defines the overall power efficiency and hence the battery lifetime. Vbat may be lower than 1.8V because the programmable switch configurations are able to convert both up and down.

The switched capacitor DC-DC converter 100 may be arranged in a behind-the-ear housing 20 shown in FIG. 1 so as to provide charge to one or more electrical components in the hearing aid 10, wherein the components may be arranged in the behind-the-ear housing 20 or in the in-the-car part 30. Similarly, the switched capacitor DC-DC converter 100 may be arranged in an in-the-ear housing 55. Additionally, a switched capacitor DC-DC converter 100 may be arranged in an in-the-ear part 30 of a behind-the-ear hearing aid 10. Such an arrangement is advantageous for providing several voltage levels to components placed in the in-the-ear part 30, such as a sensor, a processor or other power consuming devices. By providing the switched capacitor DCDC converter 100 in the in-the-ear part 30, the need for providing several charge lines to power components in the in-the-ear part 30 is advantageously eliminated or reduced, as the conversion is performed directly in the in-the-ear part 30.

A hearing aid may comprise an antenna and wireless interface for communicating with external devices, such as mobile phones, streaming devices, remote controls, and/or computers. Such a wireless interface needs power when transmitting or receiving data. The wireless interface may operate according to a protocol and may be configured to provide a signal to the power supply circuitry, which may then prepare a switched capacitor DC-DC converter to prepare a suitable supply. This will be discussed in more detail with reference to FIG. 4A. In FIG. 4B an alternative configuration is illustrated.

Hearing aids 10, 50 may have one or more memory units which may be internal to the processor or external to the processor. These memory units need power when accessed by the processor, or other components in the hearing aid.

Figure 4A:
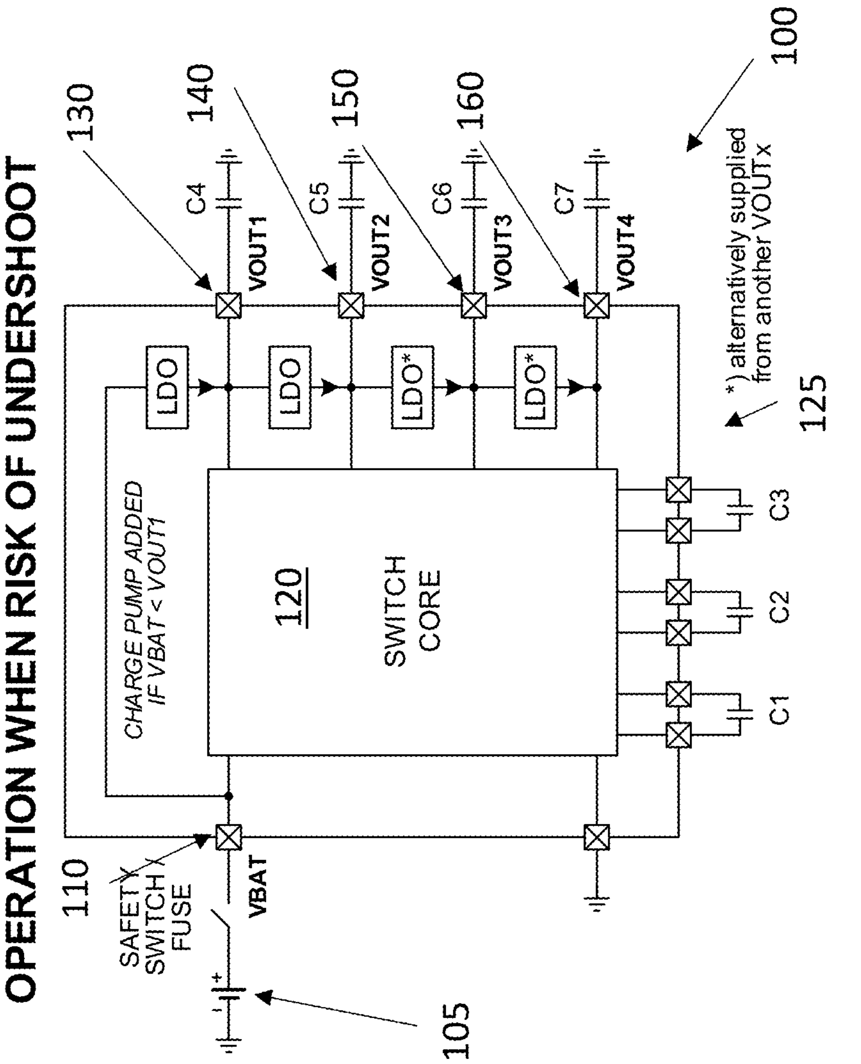
FIG. 4A schematically illustrates a switched capacitor DC-DC converter in operation with a risk of undershoot, FIG. 4B schematically illustrates an alternative switched capacitor DC-DC converter in operation with a risk of undershoot.
Figure 4B:
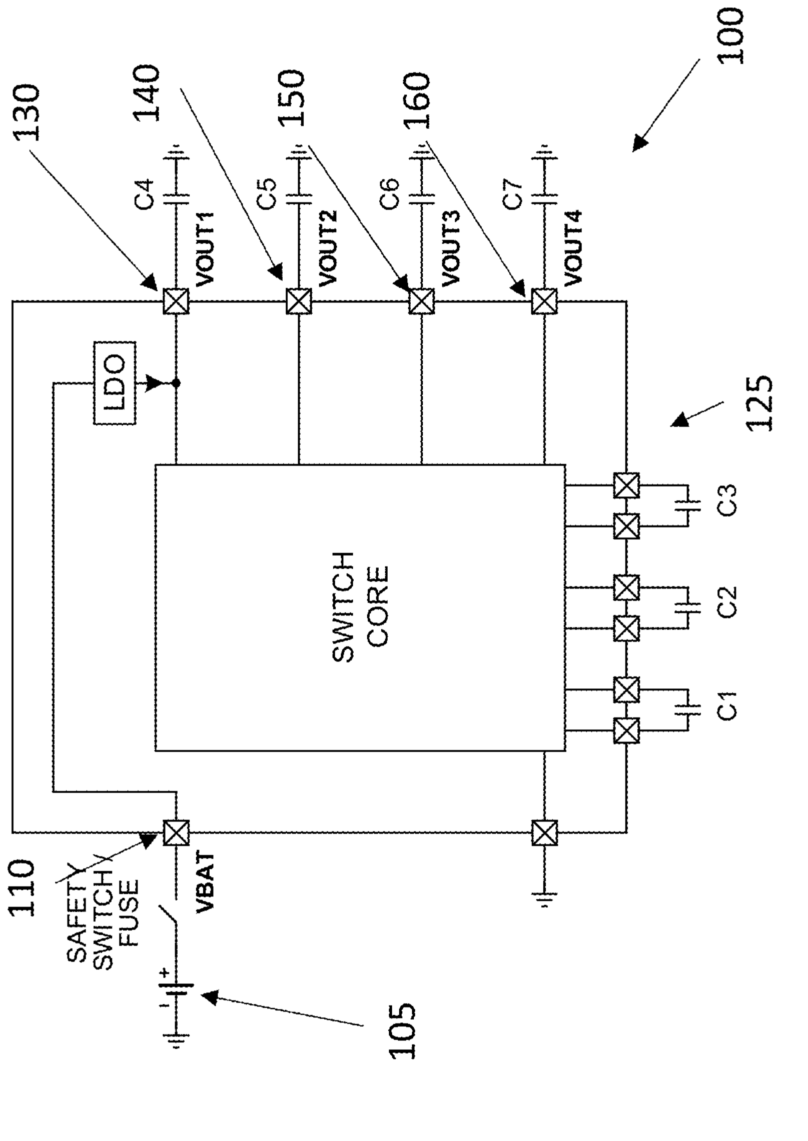

FIG. 4A illustrates switched capacitor DC-DC converter 100 of FIG. 3, further comprising four Low Dropout Regulators (denoted LDO in FIG. 3). Generally, a plurality of Low Dropout Regulators LDO may be arranged parallel to switch core 120 at each output port. As the present switch core 120 provides four output voltages at four output ports, four LDOs are arranged parallel to the outputs. Low Dropout Regulators LDO are configured to be activated when a risk of undershoot is detected. This mode of operation may an example of an “undershoot mode”.

The activation of this mode may for instance be initiated by an external component that detects or otherwise receives information that a certain situation is about to occur. This could for instance be a situation where a processor needs to access a memory unit, such as an NVRAM, which require a higher delivery of power. Other actions could be a transmission of a data package, such as a Bluetooth package, such as an advertising package. The information may e.g. be received via an interrupt signal from an external unit or device, such as an interrupt signal from a wireless interface configured to communicate using a standardized protocol, such as Bluetooth, or via an interrupt signal from a signal processor when the signal processor needs to read and/or write to a memory unit that is external to the signal processor. The information may be provided via a prediction device that monitor power usage and analyses previous actions to identify and predict future, such as imminent, power drains, from one or more output ports.

In connection with the Low Dropout Regulator, a charge pump for the Low Dropout Regulator may be activated if the input voltage is below a certain voltage threshold. This will allow the Low Dropout Regulator to operate properly despite a drop in supply voltage.

Prior to use of the switch core 120, the Low Dropout Regulators charges the capacitors to a respective normal level or slightly above.

In the case of extreme load conditions and/or limited margin between the unloaded output voltages and the rated minimum output voltages, i.e. with limited room for output voltage ripple, there is a risk of undershoot. To deal with this, there are a different options. Firstly, in one example, it may be switched to operation from a linear regulator (LDO), as described above. However, in a second example, alternatively or additionally, it is possible to increasing the switching clock frequency (i.e. the frequency of the clock phase signals), as will be explained in more detail with respect to FIG. 7. Thirdly, according to another alternative or additional approach, a different (e.g. the next higher or lower) switching configuration of the switching scheme may be employed, i.e. changing to the next voltage ratio mode or gear, possibly including skipping to avoid overshoot.

All these three options degrade power efficiency. An additional approach for such conditions is to use switching core 120 in parallel with Low Dropout Regulators LDO with their target voltages set slightly above the predetermined minimum voltages. This means that the LDOs help by supplying additional current only in critical situations i.e. during load peaks and only for the affected outputs voltages. The specific configuration of the LDOs (drawing current from the output immediately above) ensures decent power efficiency even when using the LDO and it provides load balancing which spreads the load on several domains and their respective decoupling capacitors and thereby improves regulator performance, which reduces or eliminates the needed switching clock frequency. One beneficial operation mode includes that the LDO supplying 1.8V may be activated as the only LDO with the switch core generating the three other output voltages.

Figure 5:
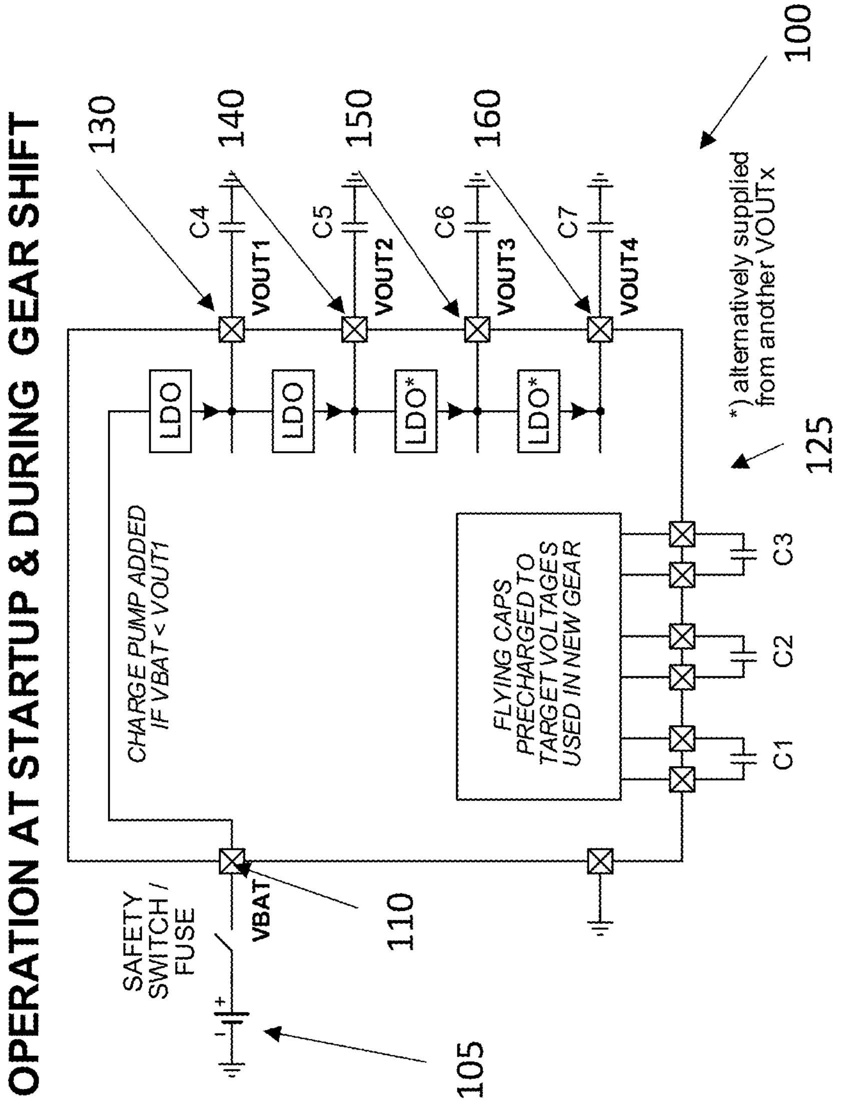
FIG. 5 schematically illustrates a switched capacitor DC-DC converter in operation at start-up and during ratio switch.

FIG. 5 now illustrates the switch core 120 in a so called “startup mode”. The setup may also be applied during gear shifts, so that this mode may also be referred to a “gear shift mode”, or “ratio shift mode”

To create a fully functional power supply solution, it is also beneficial to deal with initial conditions and transitions between different switching configurations, i.e. voltage ratio modes. It turns out that the LDO solution described above is also applicable to address these challenges in an efficient way i.e. with low circuit complexity and in a robust manner.

At startup, all output voltages and all flying capacitors may be slowly charged to their nominal values, with no inrush current issues, and the system may be immediately ready for operation once the output voltages have settled. Switch core operation can be started immediately, without providing any output voltage spikes due to charging the flying capacitors.

The regulator will typically operate in a given ratio mode or gear for a relatively long time (i.e. in “normal mode”), often hours. However, when the battery voltage approaches a transition region, the regulator may need to switch between two ratio modes multiple times, which may be due to varying load conditions. This may create excessive ripple effects on the output voltages, i.e. due to the changing ratio modes, and possible voltage spikes, due to charging the flying capacitors.

The ripples are typically handled by implementing a degree of hysteresis on the ratio-shift trigger voltage and/or delayed switching to lower voltages. The spikes may be handled by ensuring that the decoupling caps are much larger than the flying caps. However, this either leads to a significantly larger PCB area or lower power efficiency because smaller flying capacitors must be accompanied by a higher switching rate (all parasitic capacitances switched at a higher rate means deteriorated power efficiency).

With the circuit described herein, e.g. in FIGS. 4 and 5, it is possible to simply turn off the switching core, and, to supply the output voltages via the LDOs while softly pre-charging the flying capacitors to the new target values. By charging to nominal values (1.8V, 1.2V, 0.9V, and 0.6V), or slightly above, it is possible to then quickly be ready to initiate the next ratio mode shift or gear shift with minimal fluctuation on the output. The shift could happen after a (very short) predefined period of time, e.g. 1 ms, or be deliberately delayed (seconds or minutes). Using the LDOs with a target voltage set to nominal, or slightly above, for e.g. a second, or longer, softens the step function of the output voltages, this means that the output voltage transition is handled in two steps instead of one.

A controller may be arranged in connection with the switched capacitor DC-DC converter so as to control the operation of one or more elements, or the entire, switched capacitor DC-DC converter.

Figure 6:
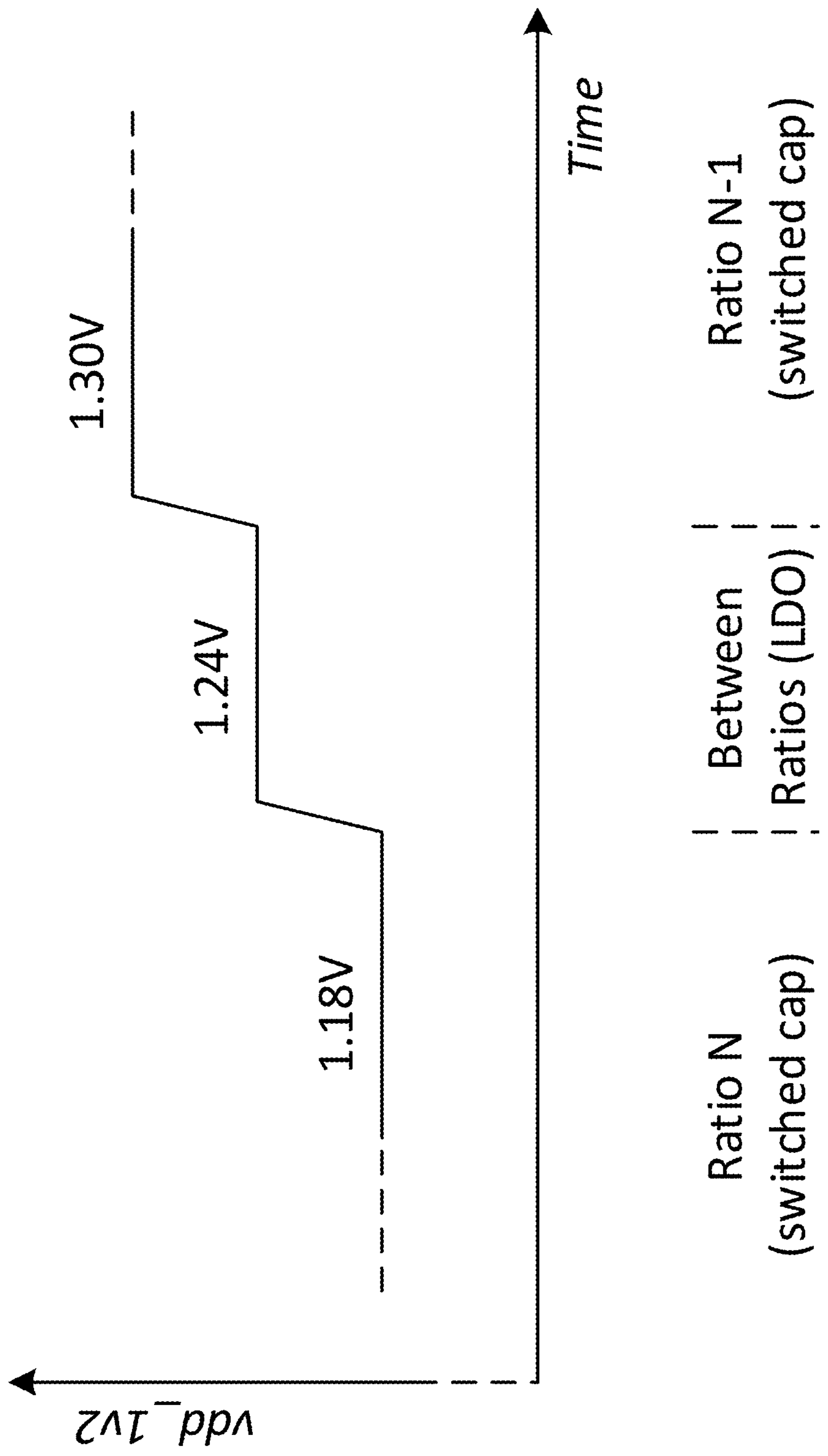
FIG. 6 schematically illustrates a scheme for creating a softer switching between ratios.

FIG. 6 illustrates a scheme for creating a softer switching between ratios. In this example the voltage Vdd is 1.2V, but the underlying scheme applies equally for other output voltages. After a first phase in which the switched capacitor DC-DC converter is active, the LDO takes over, as described above, and regulates the output voltage to a given level. Here, the level is between two switching configurations or ratio steps, wherein the nth ratio step or switching configuration is at 1.18V, the intermediate step supplied by the LDO is at 1.24V, and the end, i.e. the (n−1)th step or switching configuration is at 1.30V. The nth and the (n−1)th steps or configurations are provided by the flying capacitors, and the intermediate step is provided by the LDO. This advantageously provides a smooth transition when the switched capacitor DC-DC converter changes between switching from a lower to a higher ratio or gear. A steep step may result in audible artefacts, which are not desirable as they may be perceived as annoying or disturbing to the wearer.

The flying capacitors may be charged relatively slowly to the new level so as to even further avoid artefacts. The LDO may, as an alternative to the previously illustrated circuit, be connected to the input voltage, e.g. Vbat, or lie between Vbat and a respective output port.

Figure 7:
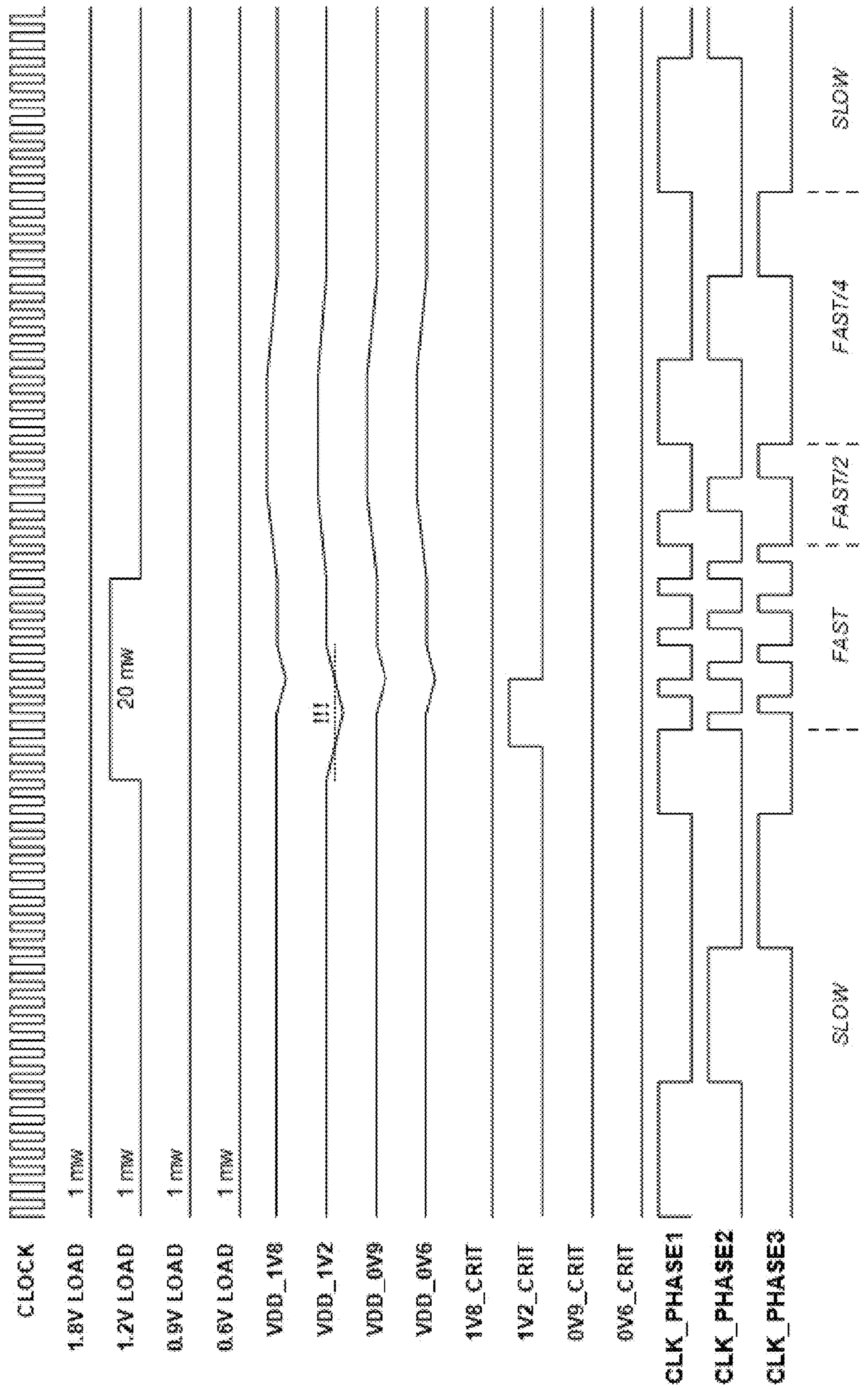
FIG. 7 schematically illustrates a time view of events in a switched capacitor DC-DC converter adapting the switching frequency of clock phase signals in response to dynamically varying load conditions.

FIG. 7 illustrates a time view of events in a switched capacitor DC-DC converter 120 adapting the frequency of the clock phase signals CLK_PHASE1, CLK_PHASE2, CLK_PHASE3, in response to dynamically varying load conditions, according to an exemplary embodiment of the invention.

During normal operation (left section denoted "SLOW" in FIG. 7) there is a normal load on the four output ports 130, 140, 150 and 160, at e.g. 1 mW each. In this case, a low switching rate of e.g. 30 kHz is sufficient to guarantee that the output voltages are within the specified tolerances, which could be e.g. +10/−5%. For certain input voltage ranges there is less margin between the output voltages and the lower output limits, this is for instance near the bottom of the "saw tooth" curve (also cf. FIG. 10). In these ranges there is a risk that a sudden step in load on one or more of the output voltages e.g. from 1 mW to 20 mW, which could e.g. happen at a start of transmission, or reception, of a Bluetooth radio packet, a read or write access to a FLASH memory or other such events or other types of memory unit, such as an EEPROM, will cause one or more of the output voltages to fall below the specified limits. Generally, as explained above, this may be addressed with LDO regulators that are activated and deliver the lacking but required additional power when needed as described above.

However, an alternative or additional method to handle peak load conditions is illustrated in and described with relation to FIG. 7. The method described in the following offers advantages for some implementations in terms of power efficiency, flexibility and design complexity. LDOs may be present in a switched capacitor DC-DC converter as described, and may be part of alleviating issues during boot, during ratios shifts etc. as already described. With the method described below, the LDOs do not need to deliver power during sudden peak load conditions and as such they do not need to be as accurate, fast and power efficient as they might otherwise be required to be. In other words, the below method provides a simpler design and may be designed almost independently from the switched capacitor DC-DC converter itself.

Assume that the system operates at a digital clock of e.g. 1.2 MHz. This clock is used to generate, by means of a programmable divider module, the three or more clock phase signals CLK_PHASE1, CLK_PHASE2, CLK-_PHASE3 used by the switch core 120. These clock phase signals CLK_PHASE1, CLK_PHASE2, CLK_PHASE3 can then operate at a programmable switching rate (or clock frequency) of e.g. 33, 50, 100, 200 or 400 kHz. Further assume that at the same rate, 1.2 MHz, it is checked that neither of the output voltages are dropping to critical levels, i.e. below a threshold defined for each of the outputs, e.g. <30 mV margin for 1.8 V, <20 mV margin for 1.2 V, <15 mV margin for 0.9 V and <10 mV margin for 0.6 V. Such a check may be accomplished with an ADC or a comparator or a dynamic comparator on each of the output ports, or any other suitable unit or device. In particular a dynamic comparator may be implemented with very low power dissipation. If any one of the checks indicate that an output voltage is dropping to critical levels, an interrupt signal is given to the state machine controlling the digital divider settings. The state machine will then change the duration of the phases to be much shorter, or equivalently the switching rate to be increased significantly, e.g. from 30 kHz to 400 kHz (section denoted "FAST" in FIG. 7). This lowers the output impedance of the switch-mode regulator and therefore the output voltages will rise to safe levels. Then the checks will stop flagging a critical situation. And then after some time the state machine can change the switching rate back to the normal 30 kHz if no new interrupt is detected in the meantime (right section denoted "SLOW" in FIG. 7). This can be done in many ways-instantly or preferably gradually with a predefined rates (sections denoted "FAST/2" and "FAST/4" in FIG. 7). The same method is applicable regardless of the number of phases (2, 3, 4, and so forth) and works for both, higher and/or lower frequencies or frequency steps.

Figure 12:
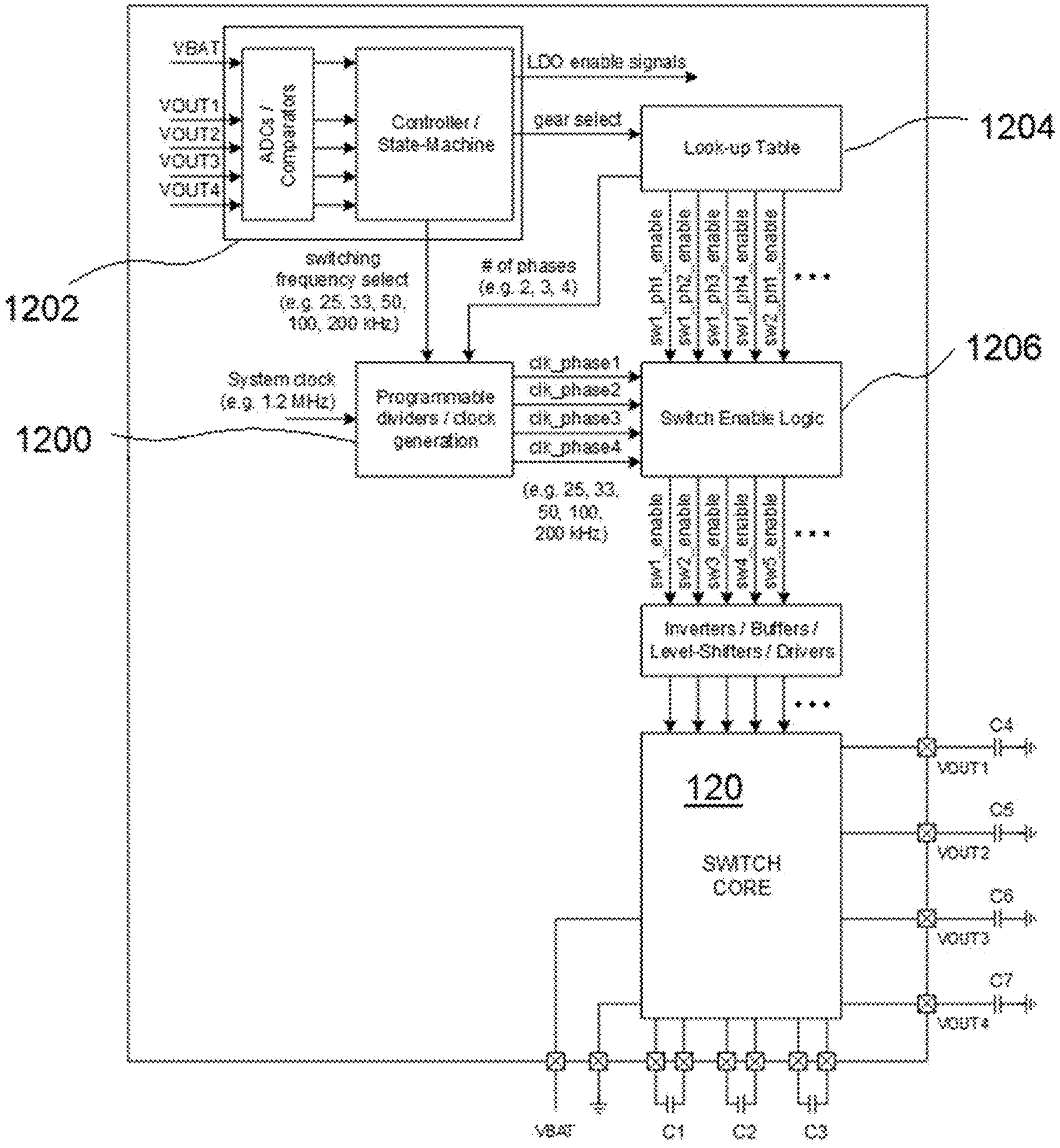
FIG. 12 schematically illustrates an exemplary switched capacitor DC-DC converter comprising logic modules configured to determine a switching configuration of the switching scheme.

FIG. 12 schematically illustrates an exemplary switched capacitor DC-DC converter 100 comprising logic modules configured to determine a switching configuration of the switching scheme.

The switching configuration comprises at least three switching sub-configurations, each switching sub-configuration being applied during an associated phase and each switching sub-configuration providing associated electrical connections for each flying capacitor.

The at least three switching sub-configurations allows connecting, during each phase, the two terminals of each flying capacitor between any two of the following list:

the input port, one of the output ports, another of the output ports, the ground, another flying capacitor terminal, in order to charge or discharge said flying capacitor, in order to generate the desired output voltages.

The switched capacitor DC-DC converter 100 comprises a divider module 1200 dividing the system clock to generate at least three periodical clock phase signals clk_phase1, clk_phase2, clk_phase3, clk_phase4.

The switching rate value of the clock phase signals is received from the controller module 1202 (also called gear selection module 1202) described below.

Figure 13A:
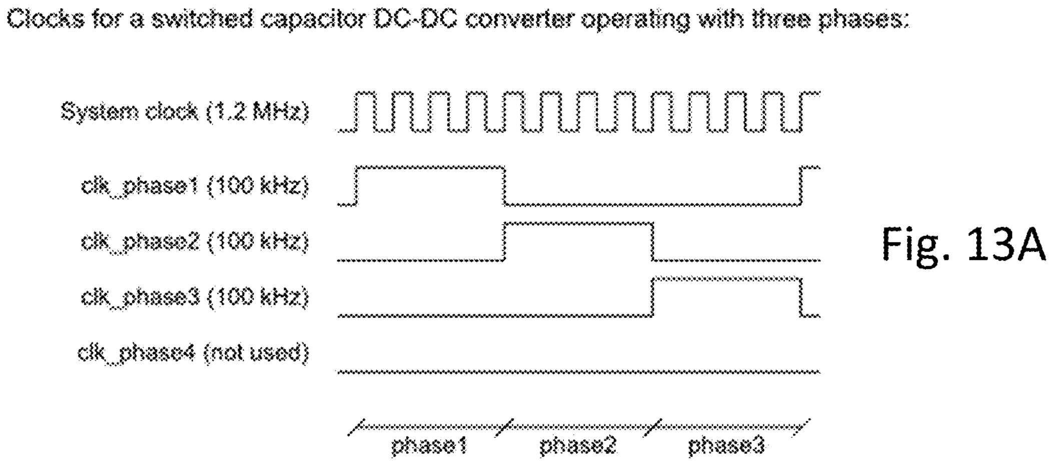
FIG. 13A, 13B show examples of periodical clock phase signals.

FIG. 13A shows an example of three periodical clock phase signals clk_phase1, clk_phase2, clk_phase3, comprising three phases phase1, phase2, phase3. The three periodical clock phase signals clk_phase1, clk_phase2, clk_phase3 have non overlapping pulses defining the three periodical phases:

during a first phase, a first clock phase signal clk_phase1 is at a high level and the two other clock phase signals clk_phase2, clk_phase3 are at a low level, during a second phase, a second clock phase signal clk_phase2 is at a high level and the two other clock phase signals clk_phase1, clk_phase3 are at a low level, during a third phase, a third clock phase signal clk_phase3 is at a high level and the two other clock phase signals clk_phase1, clk_phase2 are at a low level.

Figure 13B:
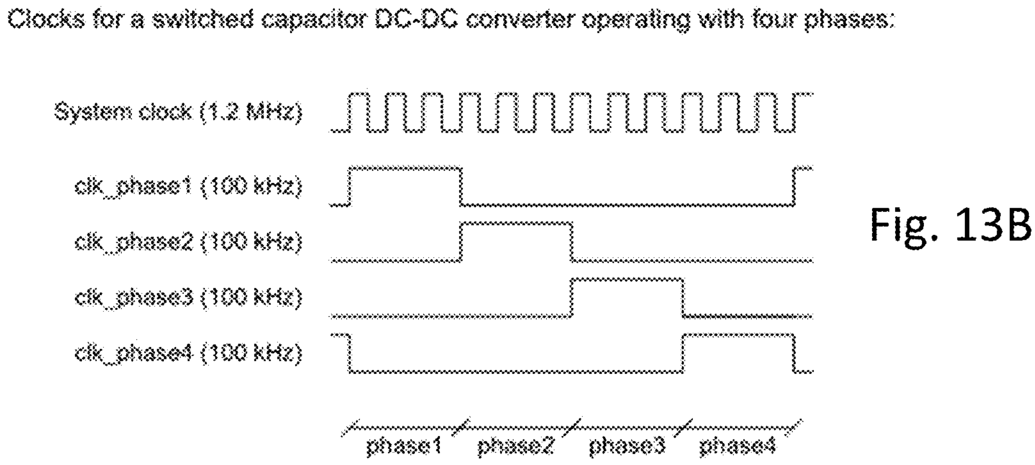

FIG. 13B shows an example of four periodical clock phase signals clk_phase1, clk_phase2, clk_phase3, clk_phase4 comprising four phases phase1, phase2, phase3, phase4. The four periodical clock phase signals clk_phase1, clk_phase2, clk_phase3, clk_phase4 have non overlapping pulses defining the four periodical phases.

The switched capacitor DC-DC converter 100 comprises a gear selection module 1202 measuring the value of the input voltage and determining the ratios to be applied to the measured input voltage in order to generate the desired output voltages.

The determined ratios are transmitted to a look-up table module 1204 of the switched capacitor DC-DC converter 100 which generates enabling signals (sw1_ph1_enable, sw1_ph2_enable, sw1_ph3_enable, sw1_ph4_enable, sw2_ph1_enable, etc.) based on a stored table and the determined ratios.

Figures 14, 15:
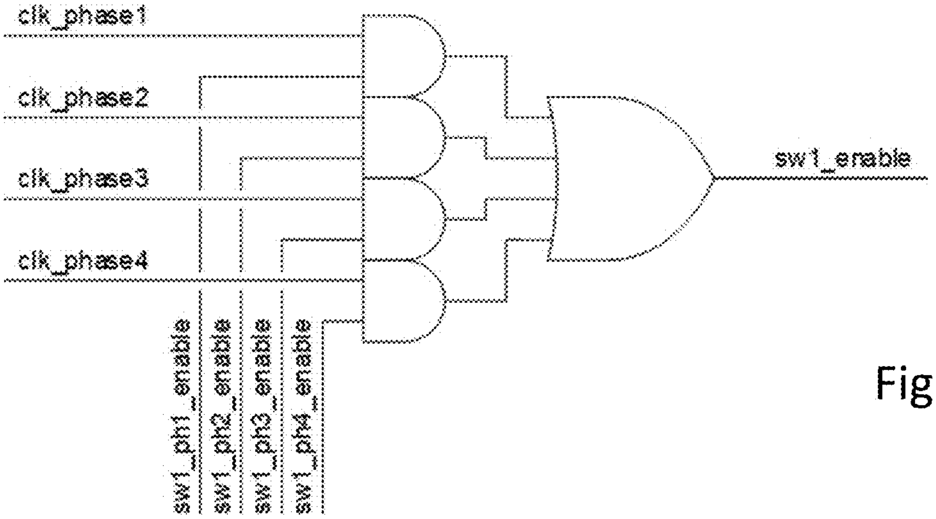
FIG. 14 shows an example of a part of a table used by the switched capacitor DC-DC converter of FIG. 12.
FIG. 15 schematically illustrates an exemplary gate submodule of the switch enable logic module.

The stored table comprises values associated to predetermined connections, during each phase, of each flying capacitors needed to obtain each voltage ratio. FIG. 14 shows an example of a part of such a table used by the look-up table module 1204.

The switched capacitor DC-DC converter 100 comprises a switch enable logic module 1206, comprising logic gates and using the enabling signals (sw1_ph1_enable, sw1_ph2_enable, sw1_ph3_enable, sw1_ph4_enable, sw2_ph1_enable etc.) and the clock phase signals clk_phase1, clk_phase2, clk_phase3, clk_phase4 etc. to generate switch control signals (sw1_enable, sw2_enable, sw3_enable, sw4_enable, sw5_enable etc.) that are then used to control the opening and closing of the switches of the switch core 120 of the switched capacitor DC-DC converter 100, and therefore that define each switching sub-configuration.

FIG. 15 schematically illustrates an exemplary gate submodule of the switch enable logic module 1206, configured to generate a first switch control signal sw1_enable, based on four clock phase signals clk_phase1, clk_phase2, clk_phase3, clk_phase4 and four enabling signals sw1_ph1_enable, sw1_ph2_enable, sw1_ph3_enable, sw1_ph4_enable. The control of the other switches is realized in a similar manner.

Figure 8:
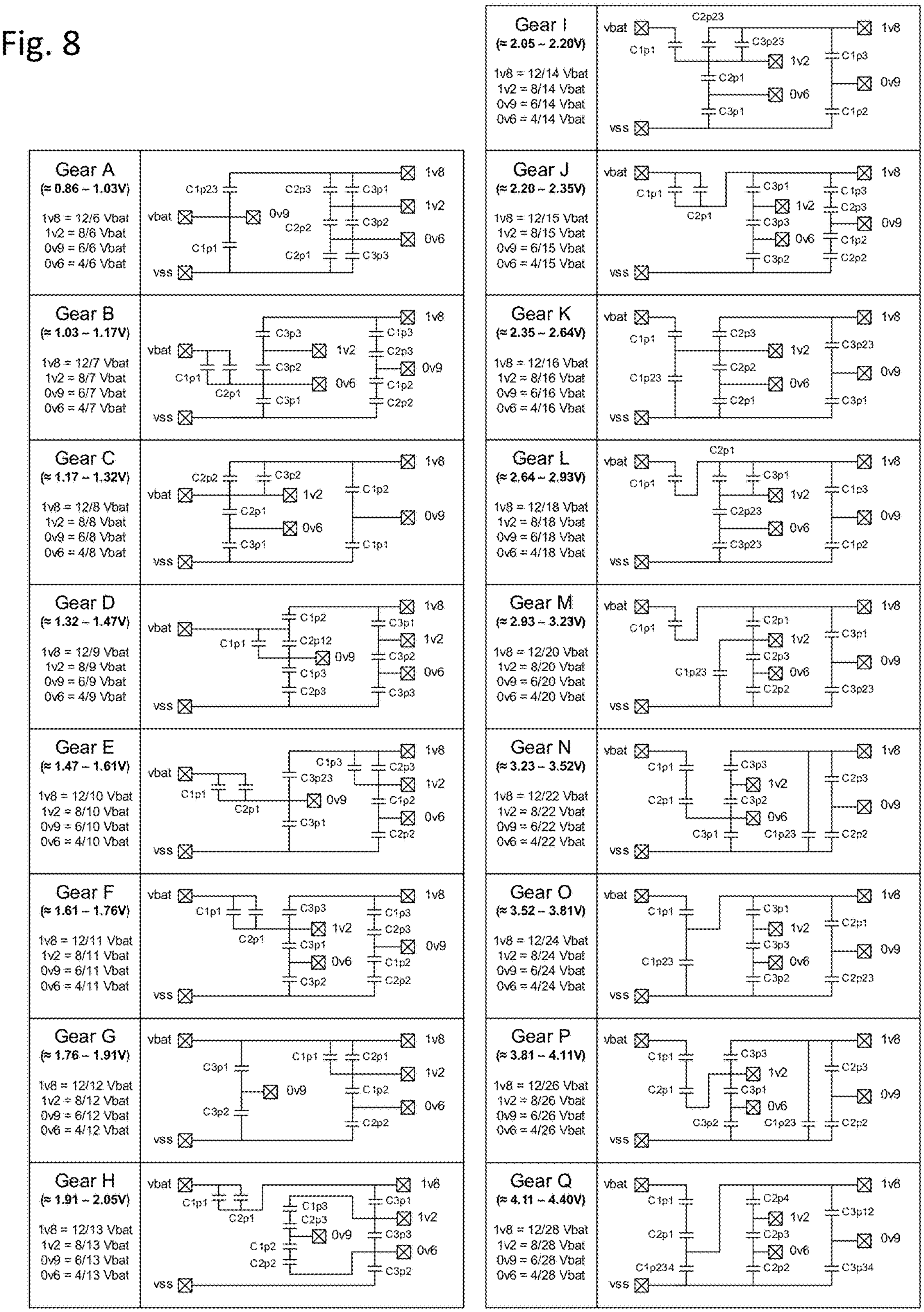
FIG. 8 schematically illustrates an exemplary switching scheme with different switching configurations in order to obtain the predefined output voltages for each of the illustrated input voltage subranges (gears)

FIG. 8 schematically illustrates an exemplary definition of gears, associated with predetermined connections, during each phase, of each flying capacitors generating the predefined output voltages for each of the illustrated input voltage subranges.

The gears A-Q cover the input voltage range (here 0.86-4.40V) and are applied depending on the specific input voltage. In the figure, the term C1p1 means that the capacitor C1 is (only) connected in this way during configurations A-J each cover input voltage subranges of approximately 150 mV, while the phase 1. Similar for the other capacitors, the px denotes the x-phase, where x is 1 to 4, the respective capacitor is connected in the given configuration, similar for e.g. C1p23, where the capacitor C1 is in the configuration during phases 2 and 3 (see also FIG. 11). For each input voltage subrange one of the switching configurations A-Q is employed. Gear or ratio mode configurations K-Q each cover input voltage subranges of approximately 300 mV. Each of the switching configurations A-Q produce four output voltages by transforming the input voltage with respective ratios a/n, b/n, c/n and d/n respectively, wherein the switching scheme employed by the switching circuitry is such that a, b, c, d is always 12, 8, 6 and 4, respectively for each of the switching configurations and n is increasing from 6 to 28 from A to Q. However, depending on the input voltage and the desired output voltages and the design of the switching circuitry these ratios may differ. FIG. 8 illustrate which of the flying capacitors C1, C2 and C3 are used during which of the phases "p".

However, it may be that only some of the switching configurations A-Q are provided, as this may depend on the input voltage range to be covered and the number and values of the desired output voltages.

Figure 11A:
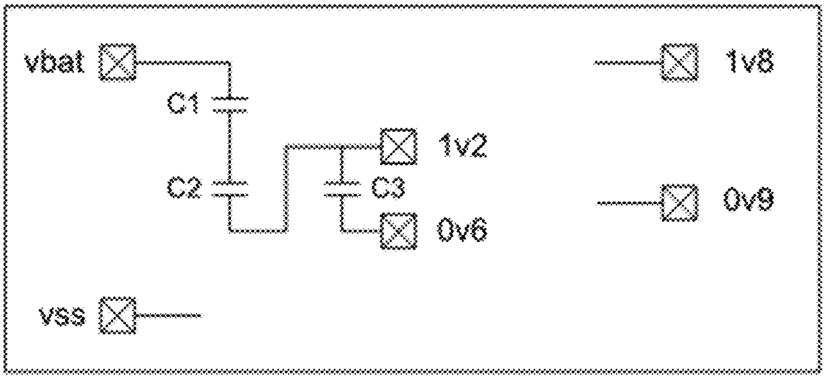
FIG. 11A, B, C schematically illustrate, for gear P of FIG. 8, the predetermined connections of each flying capacitors, during the first phase, the second phase and the third phase respectively.
Figure 11B:
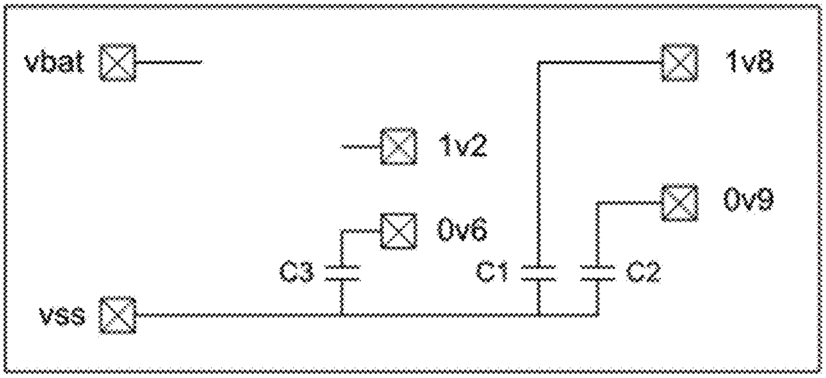
Figure 11C:
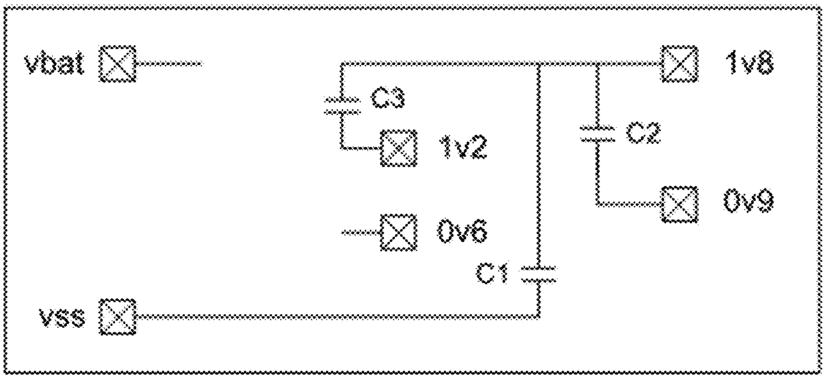

FIG. 11A schematically illustrates, for gear P of FIG. 8, the predetermined connections, during the first phase, of each flying capacitors C1, C2, C3. FIG. 11B schematically illustrates, for gear P of FIG. 8, the predetermined connections, during the second phase, of each flying capacitors C1, C2, C3. FIG. 11C schematically illustrates, for gear P of FIG. 8, the predetermined connections, during the third phase, of each flying capacitors C1, C2, C3.

Figure 9A:
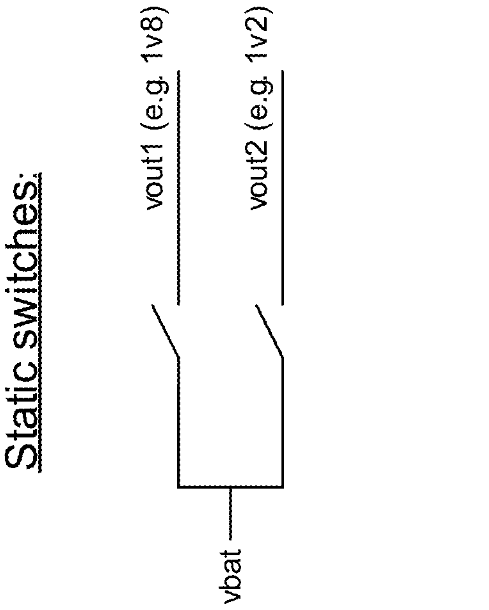
FIG. 9*a,b* schematically illustrates static and dynamic switches of an exemplary switch core for realizing the switching scheme of FIG. 8.

FIG. 9*a,b* schematically illustrates static and dynamic switches of an exemplary switch core for realizing the switching scheme and configurations A-Q of FIG. 8.

Figure 9B:
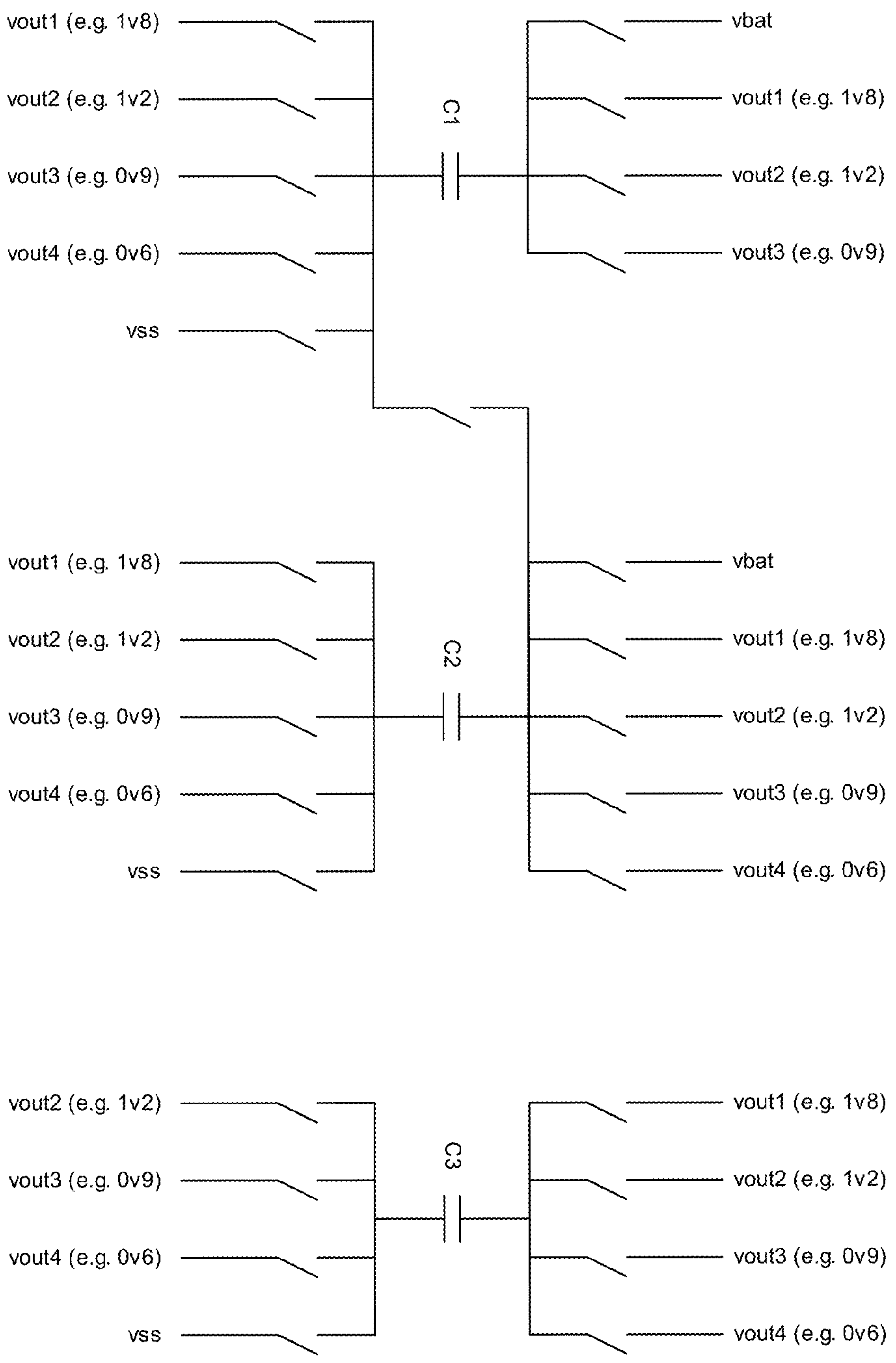

Regarding FIG. 9*a* this illustrates two static switches and FIG. 9*b* illustrates dynamic switches and the three capacitors C1, C2 and C3.

Regarding FIG. 9*a*, the on resistance in static switches may be less than or approximately 1 Ohm, such as 0.1 ohm, or may be less than 5 ohm, for example 2 or 3 ohm. With these switches, the voltage vout1 can be connected directly to the battery when vbat is near the target voltage of vout1 e.g. in gear G in the case of 1v8 and similarly vout2 can be connected directly to vbat when vbat is near the target voltage of vout2 e.g. gear C in the case of 1v2. Switch at vout1 may also be used when a chipset is powered via a programming interface or a RITE wire (e.g. supplying an in-the-ear part having one or more sensors and/or processors etc.) or any other cabled interface with a 1v8 supply that can be connected to the vbat terminal of the chipset. Switch at vout2 can ensure a close to normal ZnO HI behavior and can mitigate high ZnO output impedance.

In case only fewer switching configurations (gears) are needed, fewer dynamic switches may be sufficient.

Figure 10:
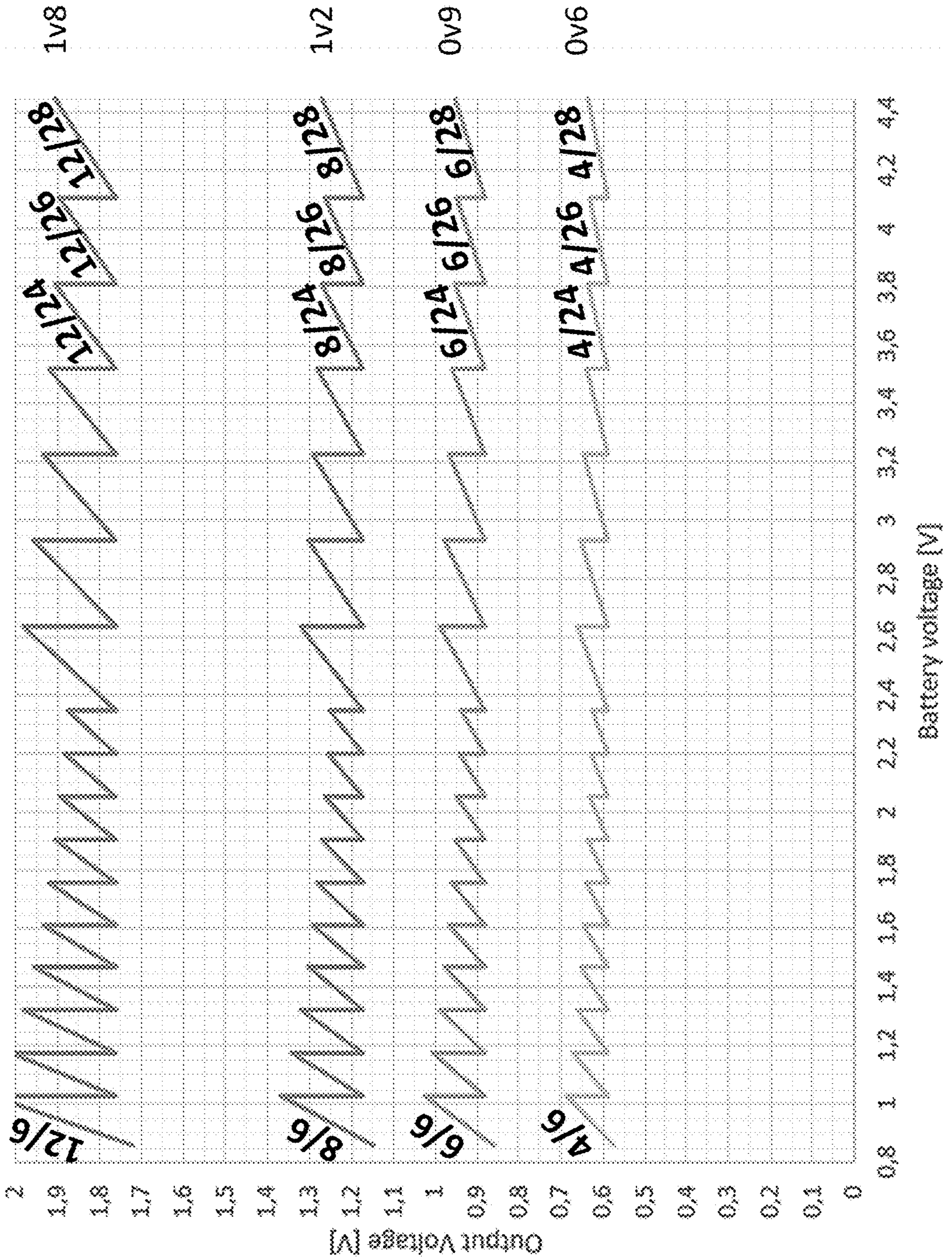
FIG. 10 schematically illustrates four different output voltages in dependence of the input voltage.

FIG. 10 schematically illustrates the resulting voltage for each of the four different output voltages (y-axis) in dependence of the input voltage (x-axis) from 0.86V using switching configuration A (left side) up to 4.4V using switching configuration Q (right side). The respective transformation ratios are also indicated for the first switching configuration, or gear, A and the last three gear configurations or switching configurations O, P, Q. As can be seen, the output voltages are very close to the respective desired target voltages allowing for efficiently providing the standard voltages in a hearing device. The illustrated graphs represent the latest switching point/voltage during discharge of a battery. Gear shift may be configured to happen earlier if needed, e.g. due to dynamic output load. While charging the battery, the input voltage is increasing. In this case the "saw tooth" curves are biased towards the upper output limits, i.e. gear shift are postponed as much as possible-thereby maximizing the hysteresis window.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element but an intervening elements may also be present, unless expressly stated otherwise. Furthermore, “connected” or “coupled” as used herein may include wirelessly connected or coupled. As used herein, the term “and/or” includes any and all combinations of one or more of the associated listed items.

The steps of any disclosed method is not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The claims are to be accorded the full scope consistent with the language of the claims, wherein reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

The invention claimed is:

1. A switched capacitor DC-DC converter comprising:

an input part configured for receiving charge from a power source at an input voltage of an input voltage range;

an output part comprising multiple output ports, the output part being configured for supplying charge to the multiple output ports for providing multiple predefined output voltages;

a plurality of flying capacitors configured for redistributing charge from the power source to the multiple output ports or in between the multiple output ports; and switching arrangements configured for implementing a capacitor switching scheme so as to provide the multiple predefined output voltages based on the input voltage, wherein the switching scheme comprises a switching configuration comprising multiple switching sub-configurations, each switching sub-configuration being applied during an associated phase.

2. The switched capacitor DC-DC converter according to claim 1, further comprising surface mounted capacitors, wherein at least one or more of the plurality of flying capacitors are Surface Mounted Devices.

3. The switched capacitor DC-DC converter according to claim 1, further comprising at least one Low Dropout Regulator arranged in parallel with the multiple output ports, wherein the at least one Low Dropout Regulator is configured for detecting and compensating undervoltage at at least one of the multiple output ports, wherein said switched capacitor DC-DC converter further comprises a controller configured to control charging of decoupling capacitors on the multiple predefined output voltages by the Low Dropout Regulators at startup and/or during gear shifts and/or under peak load conditions.

4. The switched capacitor DC-DC converter according to claim 1, wherein said converter is configured for operation in multiple predetermined modes of operation, the multiple predetermined modes of operation comprising one or more of:

a normal mode;

an undershoot mode; and a startup and/or gear shift mode, wherein the switched capacitor DC-DC converter is configured such that one or more of:

a first mode is used during normal operation of the switched capacitor DC-DC converter;

a second mode is used when one or more of the output voltages of the switched capacitor DC-DC converters drop below a predefined threshold; and a third mode is used during startup of the switched capacitor DC-DC converter, wherein at least one of the following is satisfied:

the third mode is used when switching from one configuration of the switching scheme to another configuration of the switching scheme employed in the switched capacitor DC-DC converter;

in the first mode, the switching circuitry is active;

in the second mode or the third mode, one or more linear dropout regulators are used for providing the multiple predefined output voltages;

in the second mode or the third mode, the switching arrangement is inactive; and in the first or second mode, a switching rate of the switched capacitor DC-DC converter is temporarily increased.

5. The switched capacitor DC-DC converter according to claim 1, wherein the switched capacitor DC-DC comprises one or more of:

at least or at most seven capacitors;

precisely seven capacitors;

at least three flying capacitors;

precisely three flying capacitors;

at least or at most four static decoupling capacitors;

a static decoupling capacitor for each of the output ports; and at least four output ports for providing the predefined output voltages.

6. The switched capacitor DC-DC converter according to claim 1, wherein the switching configuration comprises at least two switching sub-configurations.

7. The switched capacitor DC-DC converter according to claim 1, wherein said converter obtains the switching configuration based on the input voltage and at least two clock phase signals respectively defining the at least two phases associated with the switching configuration.

8. The switched capacitor DC-DC converter according to claim 1, wherein said output part of the converter comprises one, two, three, four, or more output ports and is configured to supply charge to the one, two, three, four, or more output ports at one, two, three, four, or more corresponding desired output voltages.

9. The switched capacitor DC-DC converter according to claim 1, further comprising a static decoupling capacitor for one or more of the multiple output ports.

10. The switched capacitor DC-DC converter according to claim 9, said static decoupling capacitors advantageously being SMD type capacitors with capacitance values substantially equal to or larger than the flying capacitors.

11. The switched capacitor DC-DC converter according to claim 1, wherein said multiple predefined output voltages comprise at least four output voltages.

12. The switched capacitor DC-DC converter according to claim 11, wherein said multiple output voltages comprise or correspond to output voltages of approximately or substantially 0.6 V, 0.9 V, 1.2 V, and 1.8V.

13. A hearing device comprising the switched capacitor DC-DC converter according to claim 1, wherein the hearing device comprises:

a behind-the-ear part and an in-the-ear part, and wherein a power source is arranged in the behind-the-ear part and the switched capacitor DC-DC converter is arranged in the in-the-ear part or in the behind-the-ear part, or an in the-ear part and the switched capacitor DC-DC converter is arranged in the in-the-ear part.

14. A hearing device comprising the switched capacitor DC-DC converter according to claim 13, wherein the hearing device comprises a behind-the-ear part and an in-the-ear part, and wherein said switched capacitor DC-DC converter is arranged in a speaker unit of said in-the-ear part.

15. A hearing device comprising the switched capacitor DC-DC converter according to claim 13, wherein at least one of the multiple output ports is simultaneously configured as a power source input port configured for receiving charge from an external charging device, and utilizing said flying capacitors to distribute charge to the others of said voltage output ports.

16. A hearing device comprising the switched capacitor DC-DC converter according to claim 15, wherein said switched capacitor DC-DC converter is further configured to simultaneously charge the said power source from said external charging device via parallel charging circuitry.

17. A method for operating a switched capacitor DC-DC converter, the method comprising:

providing power of a power source to said switched capacitor DC-DC converter;

receiving, at an input part of the switched capacitor DC-DC converter, charge from the power source at an input voltage;

supplying the charge to multiple output ports of an output part of the switched capacitor DC-DC converter at one or more corresponding output voltages;

redistributing charge from the power source to the multiple output ports or in between the output ports via at least three flying capacitors; and electrically switching the switched capacitor DC-DC converter comprising a switching circuitry having a plurality of switches based on a switching scheme so as to provide the multiple predefined output voltages based on the input voltage, wherein the switching scheme comprises a switching configuration comprising multiple switching sub-configurations, each switching sub-configuration being obtained during an associated phase.

18. The method according to claim 17, wherein the method further comprises:

repeatedly checking whether at least one of the multiple output voltages drop below a predefined threshold; and in case the at least one of the multiple output voltages drops below a predefined threshold, temporarily increasing a switching rate of the switched capacitor DC-DC converter.

19. The method according to claim 17, wherein the value of the input voltage is used to determine an associated voltage ratio and wherein the connections, during each phase, of each of the flying capacitors needed to obtain each voltage ratio are predetermined and stored in a table.

20. The method according to claim 19, wherein the determined voltage ratio is used with the table to find the associated needed connections, and switch control signals, which control the opening and closing of the switches of the switch core of the switched capacitor DC-DC converter, and define each switching sub-configuration, are generated using the table and the at least three clock phase signals.

* * * * *